US012720428B2

(12) United States Patent
Shafin et al.

(10) Patent No.: US 12,720,428 B2
(45) Date of Patent: Aug. 25, 2026

(54) RESTRICTED TWT OPERATION FOR PEER-TO-PEER COMMUNICATION

(71) Applicant: Samsung Electronics Co., Ltd., Suwon-si (KR)

(72) Inventors: Rubayet Shafin, Allen, TX (US); Boon Loong Ng, Plano, TX (US); Shiyang Leng, Allen, TX (US); Ahmed Atef Ibrahim Ibrahim, Plano, TX (US); Junsu Choi, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 17/811,056

(22) Filed: Jul. 6, 2022

(65) Prior Publication Data

US 2023/0021113 A1 Jan. 19, 2023

Related U.S. Application Data

(60) Provisional application No. 63/305,538, filed on Feb. 1, 2022, provisional application No. 63/251,454, filed (Continued)

(51) Int. Cl.
*H04W 52/02* (2009.01)

(52) U.S. Cl.
CPC ... *H04W 52/0216* (2013.01); *H04W 52/0219* (2013.01)

(58) Field of Classification Search
None
See application file for complete search history.

(56) References Cited

U.S. PATENT DOCUMENTS

2017/0195954 A1* 7/2017 Ghosh ............... H04W 52/0219
2019/0045438 A1 2/2019 Cariou (Continued)

FOREIGN PATENT DOCUMENTS

| | | | | |
|---|---|---|---|---|
| CN | 112055401 A | | 12/2020 | |
| CN | 112203344 A | | 1/2021 | |
| JP | 7629657 B2 | * | 2/2025 | ........ H04W 74/0866 |
| WO | WO-2022251117 A1 | * | 12/2022 | ........ H04W 52/0209 |

OTHER PUBLICATIONS

IEEE P802.11be-D0.4 "Part 11: Wireless LAN Medium Access Control (MAC) and Physical Layer (PHY) Specifications—Amendment 8: Enhancements for extremely high throughput (EHT)" Mar. 2021, 511 pgs.

(Continued)

*Primary Examiner* — Khaled M Kassim
*Assistant Examiner* — Shima Wasel

(57) ABSTRACT

Methods and apparatuses for facilitating restricted target wake time (TWT) operation on peer-to-peer (P2P) links in a wireless local area network. A wireless station (STA) apparatus comprises a transceiver and a processor operably coupled to the transceiver. The transceiver is configured to receive, from an access point (AP), a restricted TWT schedule and an indication of whether the restricted TWT schedule can be used for P2P communication. The processor is configured to establish a P2P link with a peer STA, and use the restricted TWT schedule for communication over the P2P link based on a determination, from the indication, that the restricted TWT schedule can be used for P2P communication.

17 Claims, 23 Drawing Sheets

Related U.S. Application Data on Oct. 1, 2021, provisional application No. 63/244,402, filed on Sep. 15, 2021, provisional application No. 63/232,472, filed on Aug. 12, 2021, provisional application No. 63/220,364, filed on Jul. 9, 2021, provisional application No. 63/220,375, filed on Jul. 9, 2021.

(56) References Cited

U.S. PATENT DOCUMENTS

| | | | | |
|---|---|---|---|---|
| 2021/0022154 | A1 | 1/2021 | Cavalcanti et al. | |
| 2021/0153125 | A1 | 5/2021 | Cariou | |
| 2022/0078844 | A1* | 3/2022 | Cherian | H04W 74/0808 |
| 2022/0110053 | A1* | 4/2022 | Chu | H04W 52/0216 |
| 2022/0386372 | A1* | 12/2022 | Xin | H04W 52/0216 |
| 2023/0262768 | A1* | 8/2023 | Ko | H04W 76/15 |
| 2023/0345365 | A1* | 10/2023 | Ho | H04W 52/0219 |
| 2023/0354418 | A1* | 11/2023 | Kim | H04W 72/12 |
| 2024/0040646 | A1* | 2/2024 | Ma | H04W 52/0216 |
| 2024/0098647 | A1* | 3/2024 | Hu | H04L 65/612 |
| 2024/0188069 | A1* | 6/2024 | Viger | H04W 72/21 |
| 2024/0244656 | A1* | 7/2024 | Baek | H04W 52/0248 |
| 2024/0292457 | A1* | 8/2024 | Dong | H04W 84/12 |
| 2024/0323844 | A1* | 9/2024 | Hu | H04W 72/0446 |

OTHER PUBLICATIONS

International Search Report and Written Opinion issued Oct. 7, 2022 regarding International Application No. PCT/KR2022/009945, 9 pages.

Hu et al., “Restricted TWT Spec Text Resolving TBDs: Part I”, doc.: IEEE 802.11-21/0462r5, May 2021, 9 pages.

Hu et al., “CC34—TBD and CID Resolution for Restricted TWT Quiet Interval Usage”, doc.: IEEE 802.11-21/0683r1, Apr. 2021, 5 pages.

Extended European Search Report issued May 29, 2024 regarding Application No. 22838046.5, 11 pages.

IEEE P802.11ax/D8.0; Draft Standard for Information technology—Telecommunications and information exchange between systems Local and metropolitan area networks—Specific requirements; “Part 11: Wireless LAN Medium Access Control (MAC) and Physical Layer (PHY) Specifications”; “Amendment 1: Enhancements for High Efficiency WLAN”; LAN/MAN Standards Committee of the IEEE Computer Society; Oct. 2020; 820 pgs.

Office Action and Search Report issued May 28, 2026, in connection with Chinese Patent Application No. 202280047421.2, 24 pages.

IEEE 802.11-21/0462r5, “CC34—TBD and CID Resolution for Restricted TWT Spec Text Resolving TBDs: Part I,” Apr. 23, 2021, 8 pages.

* cited by examiner

| | B0 | B1 B3 | B4 | B5 | B6 | B7 B9 | B10 B14 | B15 |
|---|---|---|---|---|---|---|---|---|
| | TWT Request | TWT Setup Command | Trigger | Last Broadcast Parameter Set | Flow Type | Broadcast TWT Recommendation | TWT Wake Interval Exponent | Peer-to-Peer |
| Bits: | 1 | 3 | 1 | 1 | 1 | 3 | 5 | 1 |

FIG. 7

| | B0 | B1 | B2 | B3 B7 | B8 B15 |
|---|---|---|---|---|---|
| | Reserved | Peer-to-Peer Restricted TWT | Reserved | Broadcast TWT ID | Broadcast TWT Persistence |
| Bits: | 1 | 1 | 1 | 5 | 8 |

FIG. 8

| | Request Type | Target Wake Time | Nominal Minimum TWT Wake Duration | TWT Wake Interval Mantissa | Broadcast TWT Info | Restricted TWT Peer-to-Peer TID Bitmap |
|---|---|---|---|---|---|---|
| Octets: | 2 | 2 | 1 | 2 | 2 | 0 or 2 |

FIG. 9

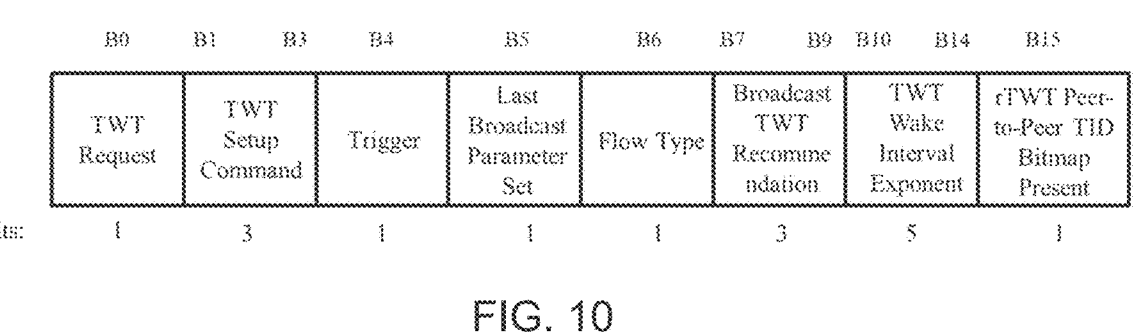
FIG. 10
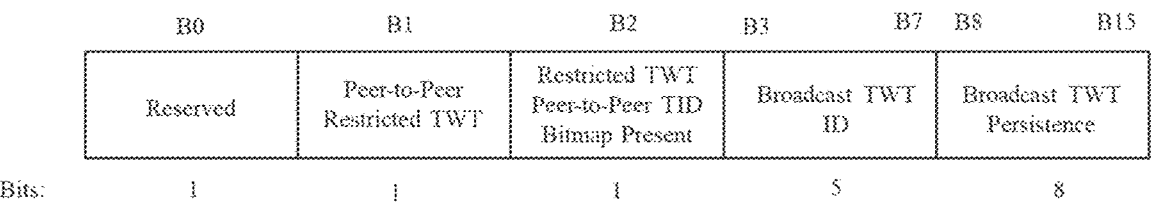
FIG. 11
| | Request Type | Target Wake Time | Nominal Minimum TWT Wake Duration | TWT Wake Interval Mantissa | Broadcast TWT Info | Restricted TWT Traffic Info (optional) |
|---|---|---|---|---|---|---|
| Octets: | 2 | 2 | 1 | 2 | 2 | 0 or 3 |
FIG. 12
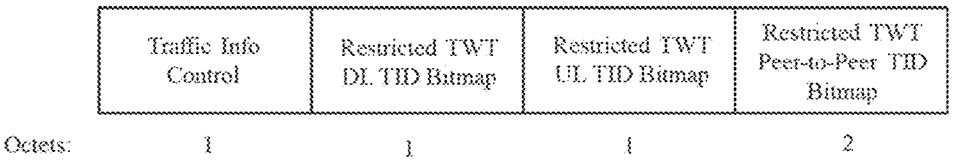
FIG. 13

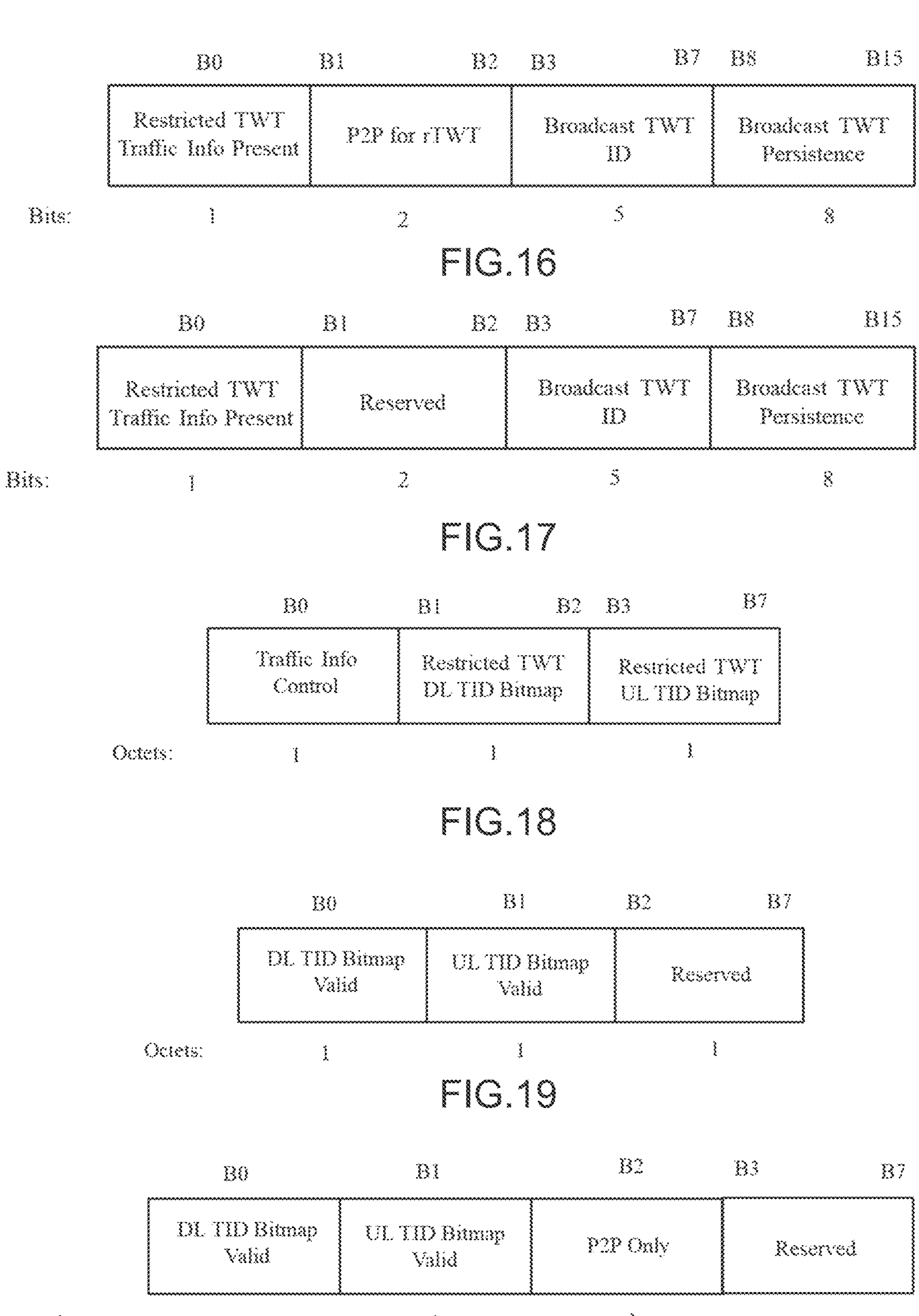
B0
B1
B2
B3
B7
B8
B15
Restricted TWT Traffic Info Present
P2P for rTWT
Broadcast TWT ID
Broadcast TWT Persistence
Bits:
1
2
5
8
FIG.16
B0
B1
B2
B3
B7
B8
B15
Restricted TWT Traffic Info Present
Reserved
Broadcast TWT ID
Broadcast TWT Persistence
Bits:
1
2
5
8
FIG.17
B0
B1
B2
B3
B7
Traffic Info Control
Restricted TWT DL TID Bitmap
Restricted TWT UL TID Bitmap
Octets:
1
1
1
FIG.18
B0
B1
B2
B7
DL TID Bitmap Valid
UL TID Bitmap Valid
Reserved
Octets:
1
1
1
FIG.19
B0
B1
B2
B3
B7
DL TID Bitmap Valid
UL TID Bitmap Valid
P2P Only
Reserved
Octets:
1
1
1
FIG. 20

| | Request Type | Target Wake Time | Nominal Minimum TWT Wake Duration | TWT Wake Interval Mantissa | Broadcast TWT Info | Restricted TWT Traffic Info (optional) |
|---|---|---|---|---|---|---|
| Octets: | 2 | 2 | 1 | 2 | 2 | 0 or 3 |

| | Traffic Info Control | Restricted TWT DL TID Bitmap | Restricted TWT UL TID Bitmap | Restricted TWT Peer-to-Peer TID Bitmap |
|---|---|---|---|---|
| Octets: | 1 | 1 | 1 | 2 |

RESTRICTED TWT OPERATION FOR PEER-TO-PEER COMMUNICATION

CROSS-REFERENCE TO RELATED APPLICATION(S) AND CLAIM OF PRIORITY

This application claims priority under 35 U.S.C. § 119(e) to U.S. Provisional Patent Application No. 63/220,364 filed on Jul. 9, 2021, U.S. Provisional Patent Application No. 63/220,375 filed on Jul. 9, 2021, U.S. Provisional Patent Application No. 63/232,472 filed on Aug. 12, 2021, U.S. Provisional Patent Application No. 63/244,402 filed on Sep. 15, 2021, U.S. Provisional Patent Application No. 63/251,454 filed on Oct. 1, 2021, and U.S. Provisional Patent Application No. 63/305,538 filed Feb. 1, 2022, which are hereby incorporated by reference in their entirety.

TECHNICAL FIELD

This disclosure relates generally to power saving in peer-to-peer wireless communications systems. Embodiments of this disclosure relate to methods and apparatuses for implementing broadcast target wake time and restricted target wake time operation on peer-to-peer links in a wireless local area network communications system.

BACKGROUND

Wireless local area network (WLAN) technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Target Wake Time (TWT) is one of the important features of the IEEE 802.11ax amendment. TWT enables wake time negotiation between an AP and an associated station (STA) for improving power efficiency. With TWT operation, it suffices for a STA to only wake up at a pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

Restricted TWT (rTWT) operation, which is based on broadcast TWT operation, is a feature introduced with a view to providing better support for latency sensitive applications. Restricted TWT offers a protected service period for its member STAs by sending Quiet elements to other STAs in the basic service set (BSS) which are not members of the restricted TWT schedule, where the Quiet interval corresponding to the Quiet element overlaps with the initial portion of the restricted TWT SP. Hence, it gives more channel access opportunity for the restricted TWT member scheduled STAs, which helps latency-sensitive traffic flow.

There are multiple power saving mechanisms that are defined peer-to-peer (P2P) communication. For Tunneled Direct Link Setup (TDLS) operation, supported power saving mechanisms can be TDLS peer Power Saving Mode (PSM) operation or U-APSD mechanism. Individual TWT operation can also be established as a power saving mechanism between two TDLS peer STAs for communication over the TDLS direct link.

SUMMARY

Embodiments of the present disclosure provide methods and apparatuses for facilitating restricted TWT operation on P2P links in a wireless network (e.g., a WLAN).

In one embodiment, a STA device is provided, comprising a transceiver and a processor operably coupled to the transceiver. The transceiver is configured to receive, from an AP, a restricted TWT schedule and an indication of whether the restricted TWT schedule can be used for P2P communication. The processor is configured to establish a P2P link with a peer STA and use the restricted TWT schedule for communication over the P2P link based on a determination, from the indication, that the restricted TWT schedule can be used for P2P communication.

In another embodiment, an AP device is provided, comprising a transceiver and a processor operably coupled to the transceiver. The processor is configured to generate an indication of whether a restricted TWT schedule can be used for P2P communication by a STA over a P2P link. The transceiver is configured to broadcast the restricted TWT schedule and the indication.

In another embodiment, a method performed by the STA is provided, including the steps of receiving, from an access point (AP), a restricted target wake time (TWT) schedule and an indication of whether the restricted TWT schedule can be used for peer-to-peer (P2P) communication, establishing a P2P link with a peer STA, and using the restricted TWT schedule for communication over the P2P link based on a determination, from the indication, that the restricted TWT schedule can be used for P2P communication.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example of a Request Type field format in a Broadcast TWT Parameter Set field with a Peer-to-Peer subfield according to various embodiments of the present disclosure;

FIG. 8 illustrates an example of a Broadcast TWT Info subfield format in a Broadcast TWT Parameter Set field with a Peer-to-Peer Restricted TWT subfield according to various embodiments of the present disclosure;

FIG. 9 illustrates an example of a Broadcast TWT Parameter Set field format with a Restricted TWT Peer-to-Peer TID Bitmap subfield according to various embodiments of the present disclosure;

FIG. 10 illustrates an example of a Request Type field format in a Broadcast TWT Parameter Set field including an rTWT Peer-to-Peer TID Bitmap Present subfield according to various embodiments of the present disclosure;

FIG. 11 illustrates an example of a Broadcast TWT Info subfield format in a Broadcast TWT Parameter Set field with a Restricted TWT Peer-to-Peer TID Bitmap Present subfield according to various embodiments of the present disclosure;

FIG. 12 illustrates an example of a Broadcast TWT Parameter Set field format with a Restricted TWT Traffic Info subfield according to various embodiments of the present disclosure;

FIG. 13 illustrates an example of a Restricted TWT Traffic Info field format with a Restricted TWT Peer-to-Peer TID Bitmap according to various embodiments of the present disclosure;

FIG. 16 illustrates an example of a Broadcast TWT Info subfield including a P2P for rTWT subfield according to various embodiments of the present disclosure;

FIG. 17 illustrates an example of a Broadcast TWT Info subfield format according to various embodiments of the present disclosure;

FIG. 18 illustrates an example of a Restricted TWT Traffic Info field according to various embodiments of the present disclosure;

FIG. 19 illustrates an example of a Traffic Info Control field format according to various embodiments of the present disclosure;

FIG. 20 illustrates another example of a Traffic Info Control field format according to various embodiments of the present disclosure;

DETAILED DESCRIPTION

Figure 1:
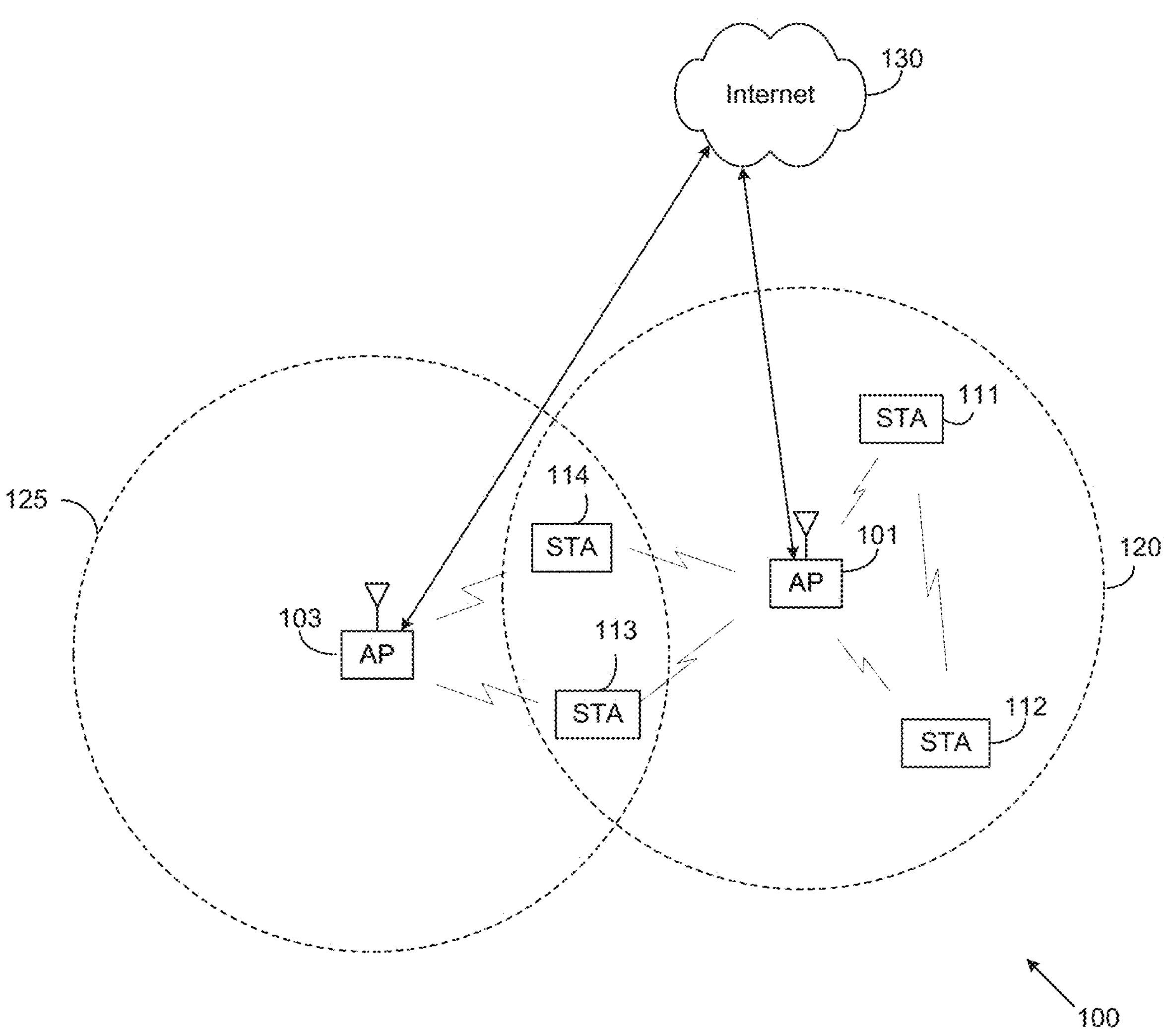
FIG. 1 illustrates an example wireless network according to various embodiments of the present disclosure.

FIGS. 1 through 33E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that restricted TWT operation can be extended for use between two STAs for peer-to-peer communication. For example, two TDLS peer STAs can use restricted TWT operation for communication over the TDLS direct link without being required to establish broadcast TWT (or restricted TWT) schedules and going through the corresponding negotiation between the two TDLS peer STAs.

However, the exact mechanisms and framework for allowing restricted TWT operation for peer-to-peer communication are currently missing. Accordingly, embodiments of the present disclosure provide apparatuses and methods that facilitate restricted TWT operation for the peer-to-peer link.

Embodiments of the present disclosure further recognize that, if restricted TWT operation is allowed for peer-to-peer communication, it will raise issues related to channel under-utilization and fairness among restricted TWT scheduled STAs and other STAs in the BSS as described below.

For example, restricted TWT operation is devised to provide better protection for latency-sensitive traffic for the TWT scheduled STAs that are members of the restricted TWT schedule. A STA can use restricted TWT schedules to communicate with another STA in a peer-to-peer communication mode. During a restricted TWT service period (SP), if both peer STAs are done with transmitting latency-sensitive packets over the peer-to-peer link before the end of restricted TWT SP, then it causes channel under-utilization for the peer-the-peer STAs if the STAs are prohibited from transmitting latency-tolerant traffic over the peer-to-peer link for a remaining duration of the SP. That is, there would be an unused portion of the restricted TWT SP for the peer-to-peer link if only latency-sensitive traffic is allowed during the restricted TWT SP.

Channel under-utilization for a peer-to-peer link due to an under-utilized restricted TWT SP can be reduced by allowing latency-tolerant traffic to be transmitted over the peer-to-peer link in addition to latency-sensitive traffic during the restricted TWT SP. Once the peer-to-peer STAs are done transmitting latency-sensitive traffic during the restricted TWT SP, and if there is still time remaining in the restricted TWT SP, if the peer-to-peer STAs are allowed to transmit latency-tolerant packets (if any) during the remaining portion of the SP, this will improve the channel utilization for the peer-to-peer STAs over the peer-to-peer link.

However, allowing latency-tolerant traffic over the peer-to-peer link creates a fairness issue. Regarding contention among the restricted TWT scheduled STAs or other pairs of peer-to-peer STAs, if one pair of peer-to-peer STAs start transmitting latency-tolerant traffic during the restricted TWT SP, it is not fair for other restricted TWT scheduled STAs or other pairs of peer-to-peer STAs (which are communicating over the peer-to-peer link using the restricted TWT schedule) that are still transmitting latency-sensitive traffic during the restricted TWT SP.

Therefore, restricted TWT operation for the peer-to-peer link creates a trade-off between channel utilization and fairness. Accordingly, embodiments of the present disclosure provide apparatuses and methods that facilitate restricted TWT operation for the peer-to-peer link while balancing the trade-off between channel under-utilization and fairness for effective restricted TWT operation for peer-to-peer communication.

Additionally, embodiments of the present disclosure recognize that restricted TWT is an implementation of broadcast TWT operation, and recognize that there are existing procedures defined for establishing individual TWT agreements between two TDLS peer STAs (or peer STAs using another P2P protocol), however, how two TDLS peer STAs can use a broadcast TWT operation as a power saving mechanism to communicate over the TDLS direct link is not defined.

Accordingly, in order to enable a TDLS peer STA to be able to establish a restricted TWT schedule with another TDLS peer STA, embodiments of the present disclosure define some mechanisms so that TDLS peer STAs can establish a broadcast TWT schedule to communicate over the TDLS direct link.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating restricted TWT operation on P2P links in a WLAN. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
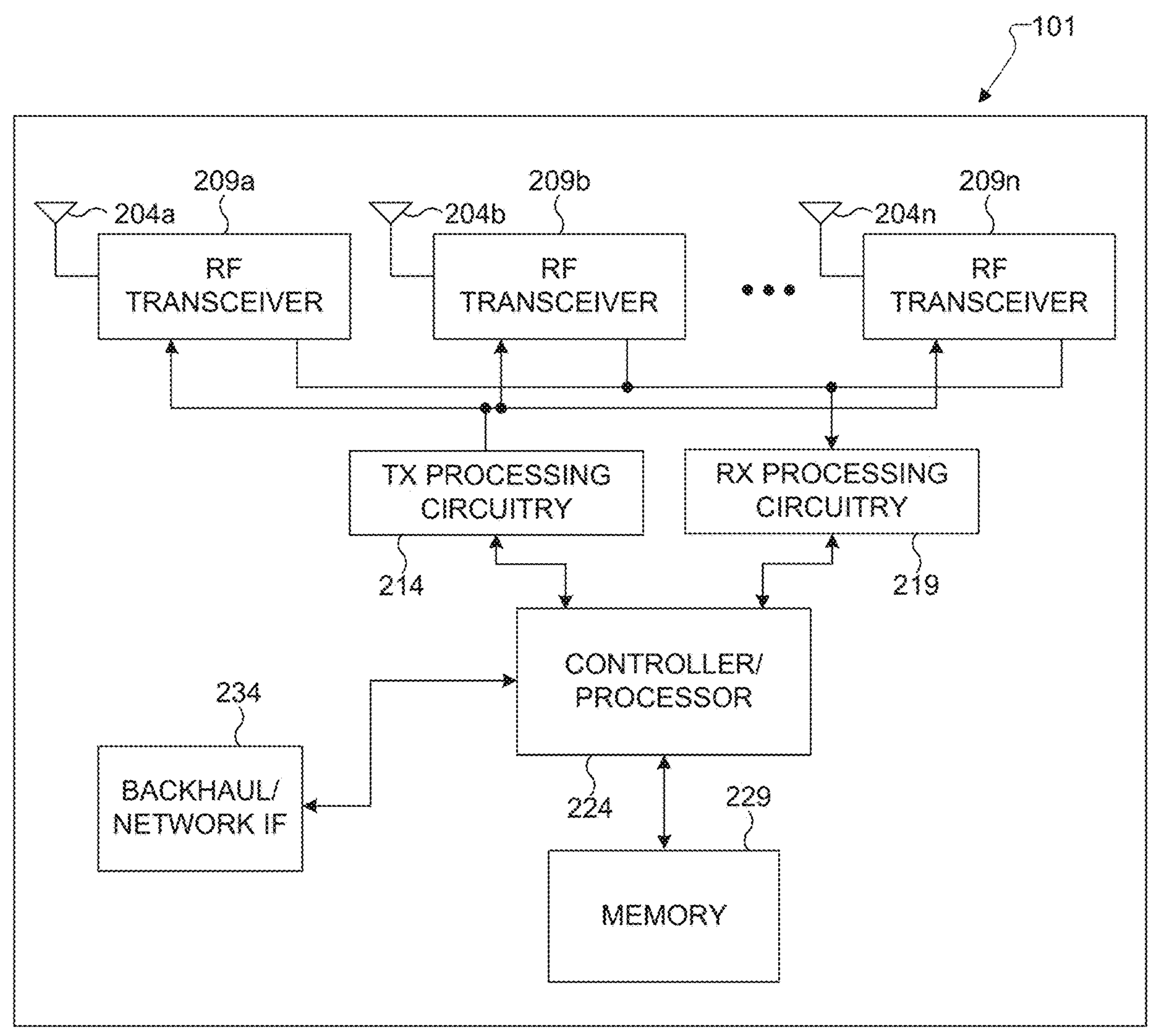
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas **204*a*-204*n*, multiple RF transceivers 209*a*-209*n*, transmit (TX) processing circuitry 214, and receive (RX) processing circuitry 219. The AP 101 also includes a controller/processor 224, a memory 229, and a backhaul or network interface 234. The RF transceivers 209*a*-209*n* receive, from the antennas 204*a*-204*n*, incoming RF signals, such as signals transmitted by STAs in the network 100. The RF transceivers 209*a*-209*n* down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224** for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers **209*a*-209*n* receive the outgoing processed baseband or IF signals from the TX processing circuitry 214 and up-converts the baseband or IF signals to RF signals that are transmitted via the antennas 204*a*-204*n***.

The controller/processor 224 can include one or more processors or other processing devices that control the overall operation of the AP 101. For example, the controller/processor 224 could control the reception of forward channel signals and the transmission of reverse channel signals by the RF transceivers **209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including facilitating restricted TWT operation on P2P links. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229** as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating restricted TWT operation on P2P links. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
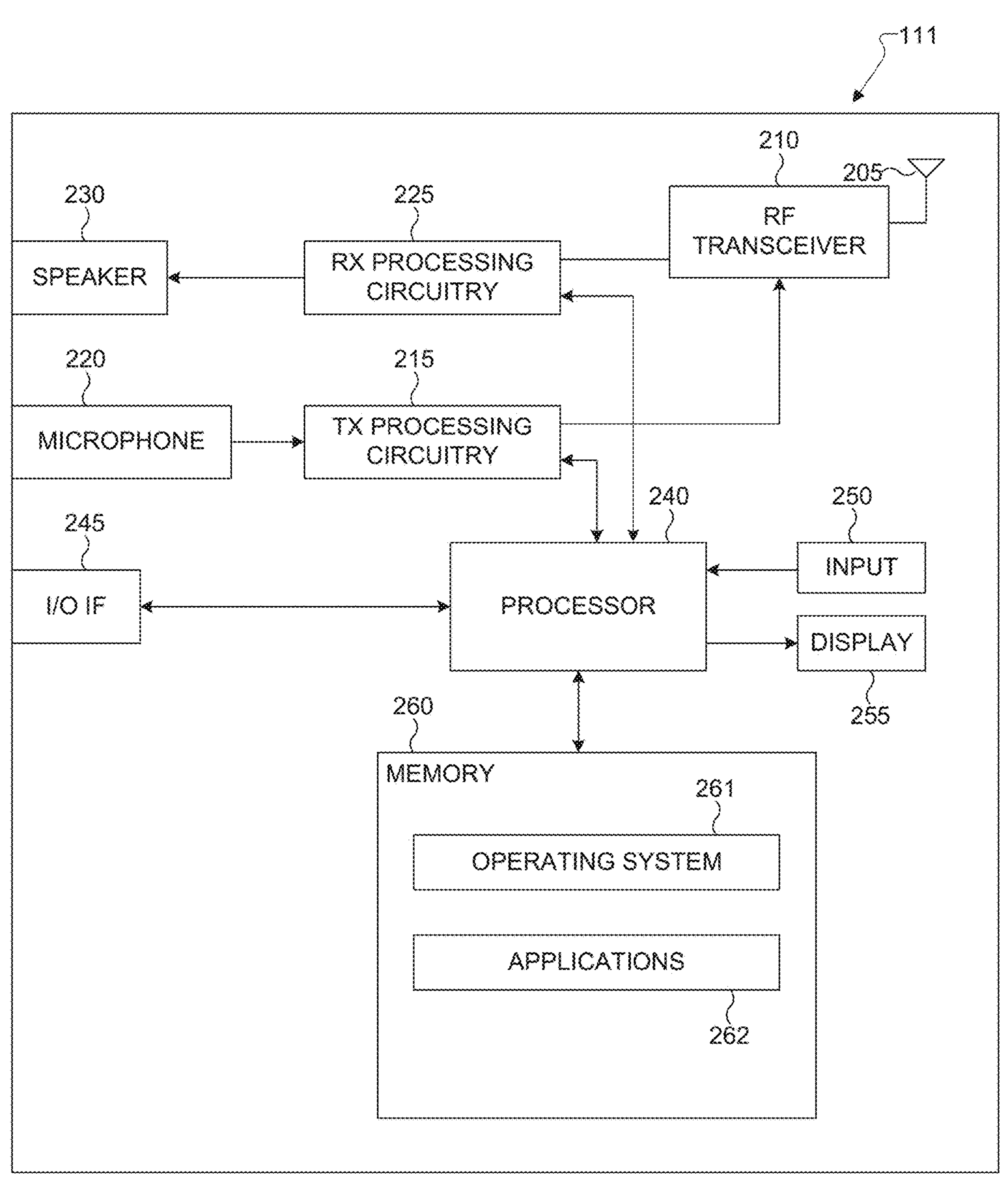
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate restricted TWT operation on P2P links. In some embodiments, the controller/processor 240 includes at least one microprocessor or microcontroller.

The controller/processor 240 is also capable of executing other processes and programs resident in the memory 260, such as operations for facilitating restricted TWT operation on P2P links. The controller/processor 240 can move data into or out of the memory 260 as required by an executing process. In some embodiments, the controller/processor 240 is configured to execute a plurality of applications 262, such as applications for detect interference from a neighboring BSS and inform the associated AP of the interference. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

According to one embodiment, an AP, while announcing restricted TWT schedules, can indicate whether or not a particular restricted TWT schedule is for peer-to-peer communication only. According to this embodiment, all pairs of STAs in the AP's BSS which have established peer-to-peer links can transmit and receive latency-sensitive traffic over the peer-to-peer links during the restricted TWT schedules that have been indicated as for peer-to-peer communication.

Figure 3:
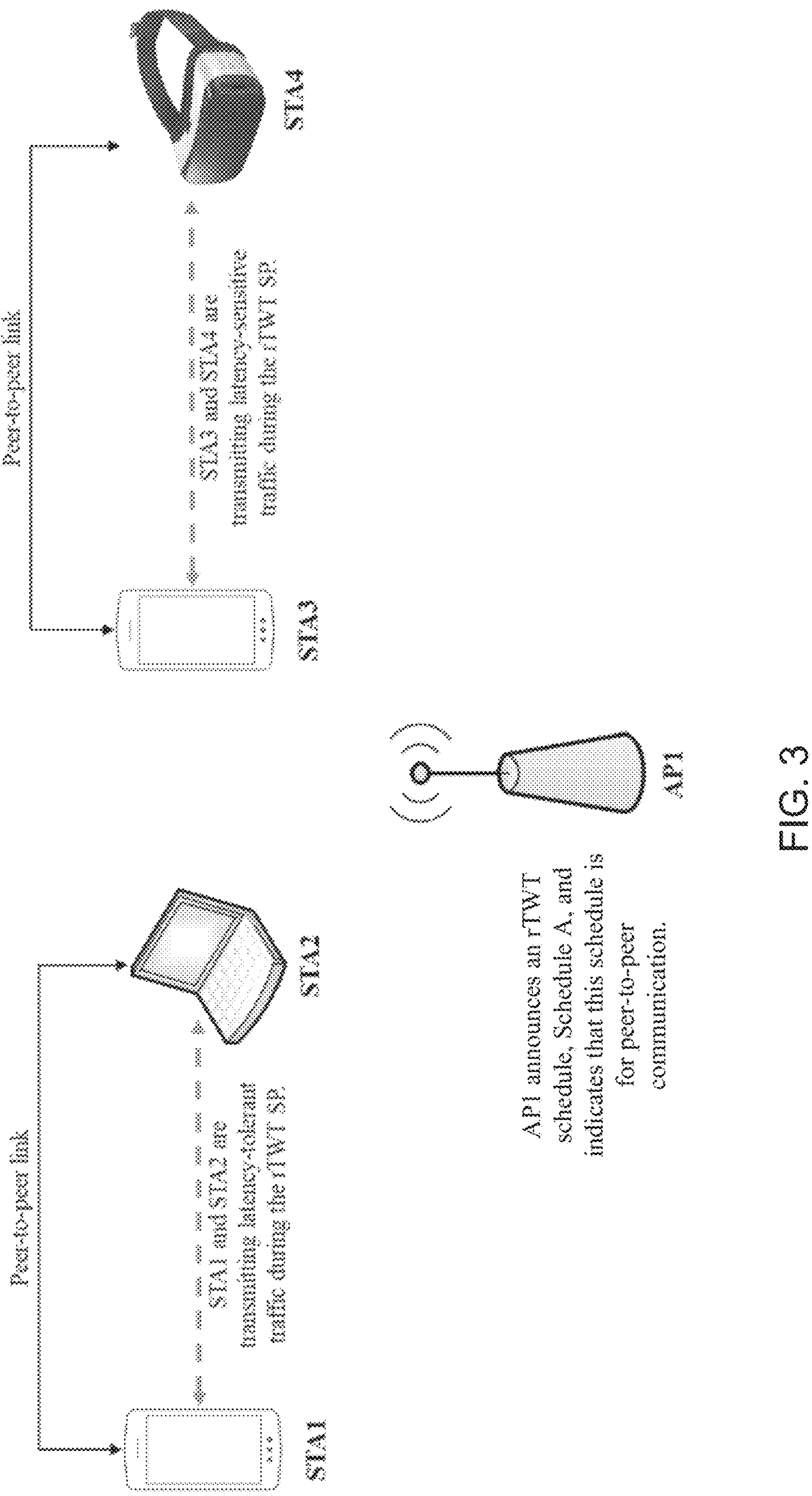
FIG. 3 illustrates an example scenario in which restricted TWT is extended for peer-to-peer communication according to various embodiments of the present disclosure.

FIG. 3 illustrates an example scenario in which restricted TWT is extended for peer-to-peer communication according to various embodiments of the present disclosure. The AP and STAs devices illustrated in FIG. 3 may correspond to APs and STAs of FIGS. 1-2B. For example, STA1, STA2, STA3, and STA4 may correspond to STAs 111-114 and AP1 may correspond to AP 101. Each of the STAs is in the BSS of AP1.

In the example of FIG. 3, AP1 announces a restricted TWT schedule (Negotiation Type subfield set to 2), Schedule A, in its BSS and indicates that this schedule is for peer-to-peer communication. In the BSS, STA1 and STA2 are a pair of STAs that have established a peer-to-peer link (e.g., a TDLS direct link) between themselves. Also, STA3 and STA4 are another pair of STAs that have established a peer-to-peer link (e.g., another TDLS direct link) between themselves. None of these four STAs establishes the restricted TWT schedule (Schedule A) with AP1.

According to one embodiment, for the case where a restricted TWT schedule is only for peer-to-peer communication, the restricted TWT scheduling AP sends a Quiet element in its BSS for protecting the restricted TWT service period (SP), and all STAs in the BSS that have established peer-to-peer links can ignore the Quiet element.

Such an embodiment is illustrated in the example of FIG. 3. During the restricted TWT SP corresponding to Schedule A, STA1, STA2, STA3, and STA4 ignore a Quiet element that is sent by AP1 to protect the restricted TWT SP corresponding to Schedule A. During the restricted TWT SP, STA1 and STA2 transmit latency-tolerant traffic over the peer-to-peer link. Also, STA3 and STA4 transmit latency-sensitive traffic over the peer-to-peer link during the restricted TWT SP corresponding to Schedule A.

According to another embodiment, for the case where a restricted TWT schedule is only for peer-to-peer communication, the restricted TWT scheduling AP sends a Quiet element in its BSS for protecting the restricted TWT SP, and all STAs in the BSS that have established peer-to-peer links can ignore the Quiet element unless the peer-to-peer STAs intend to transmit or receive latency-tolerant traffic over the peer-to-peer link (i.e., they can ignore the Quiet element if they intend to transmit or receive latency-sensitive traffic over the peer-to-peer link). According to this embodiment, STAs which have established peer-to-peer links but do not have any latency-sensitive traffic still observe the corresponding Quiet interval and refrain from transmission during that restricted TWT SP. Such an embodiment is illustrated in FIG. 4.

Figure 4:
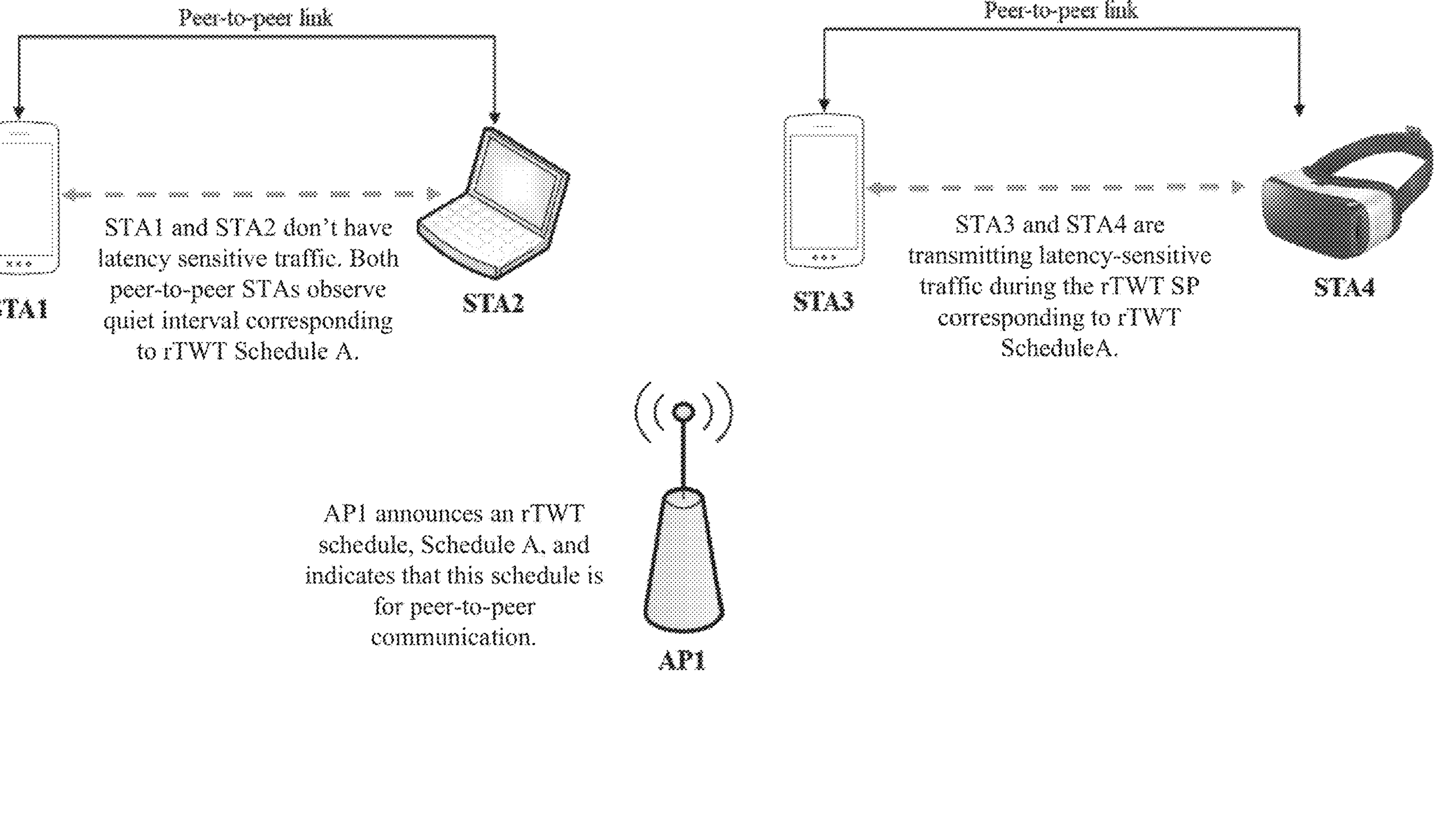
FIG. 4 illustrates another example scenario in which restricted TWT is extended for peer-to-peer communication according to various embodiments of the present disclosure.

FIG. 4 illustrates another example scenario in which restricted TWT is extended for peer-to-peer communication according to various embodiments of the present disclosure. FIG. 4 illustrates a similar scenario to that of FIG. 3, except that STA1 and STA2 are unable to transmit their latency-tolerant traffic during the restricted TWT SP corresponding to Schedule A. Despite the fact that STA1 and STA2 are peer-to-peer STAs, since they don't have any latency-sensitive traffic for transmission over the peer-to-peer link, they both observe the Quiet interval corresponding to Schedule A and refrain from transmission during the Quiet interval.

According to yet another embodiment, for the case where a restricted TWT schedule is only for peer-to-peer communication, if the pair of peer-to-peer STAs are done with transmitting latency-sensitive traffic over the peer-to-peer link before the end of a restricted TWT SP, the pair of STAs send P2P Latency-sensitive Traffic End Notification frames to their associated scheduling AP notifying the AP that their transmissions of latency-sensitive traffic over the peer-to-peer link have ended.

Other alternatives for P2P Latency-sensitive Traffic End Notification frames are also contemplated. For example, the peer-to-peer STAs can instead send Buffer Status Reports (BSR) to their associated scheduling AP once they complete transmitting latency-sensitive traffic over the peer-to-peer link. An empty buffer corresponding to latency-sensitive traffic flow would indicate to the scheduling AP that the peer-to-peer STAs are done with transmitting latency-sensitive traffic over the peer-to-peer link.

Once the scheduling AP receives such an indication of completion of latency-sensitive traffic transmission from all peer-to-peer STAs, the scheduling AP can then end the restricted TWT SP corresponding to that restricted TWT schedule for all peer-to-peer STAs. Also, the restricted TWT scheduling AP can terminate the Quiet interval corresponding to the restricted TWT SP for other STAs in the BSS, for example, by sending CF-end frames. This will strike a balance between channel utilization and fairness among STAs in the BSS.

Figure 5:
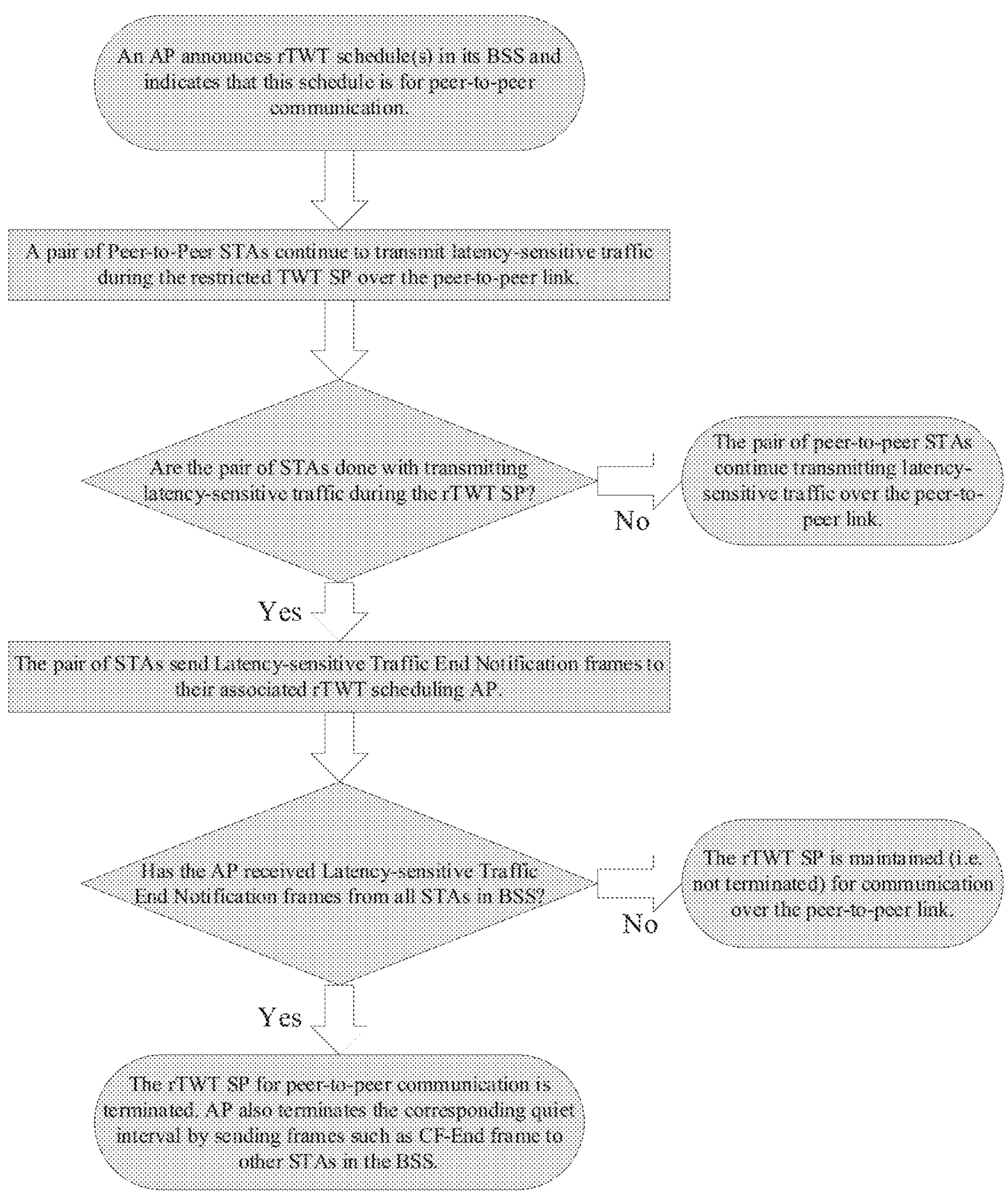
FIG. 5 illustrates a flowchart of an example restricted TWT SP termination process for peer-to-peer communication according to various embodiments of the present disclosure.

FIG. 5 illustrates a flowchart of an example restricted TWT SP termination process for peer-to-peer communication according to various embodiments of the present disclosure.

According to another embodiment, an AP, while announcing restricted TWT schedules, can indicate whether or not a particular restricted TWT schedule can be used both for peer-to-peer communication and for uplink/downlink communication between restricted TWT scheduled STAs and their associated restricted TWT scheduling AP. According to this embodiment, all pairs of STAs in the BSS which have established peer-to-peer links can transmit and receive latency-sensitive traffic over the peer-to-peer links during this restricted TWT schedule. Moreover, restricted TWT scheduled STAs that are not peer-to-peer STAs can also establish memberships of this restricted TWT schedule for communication with their associated restricted TWT scheduling AP.

Figure 6:
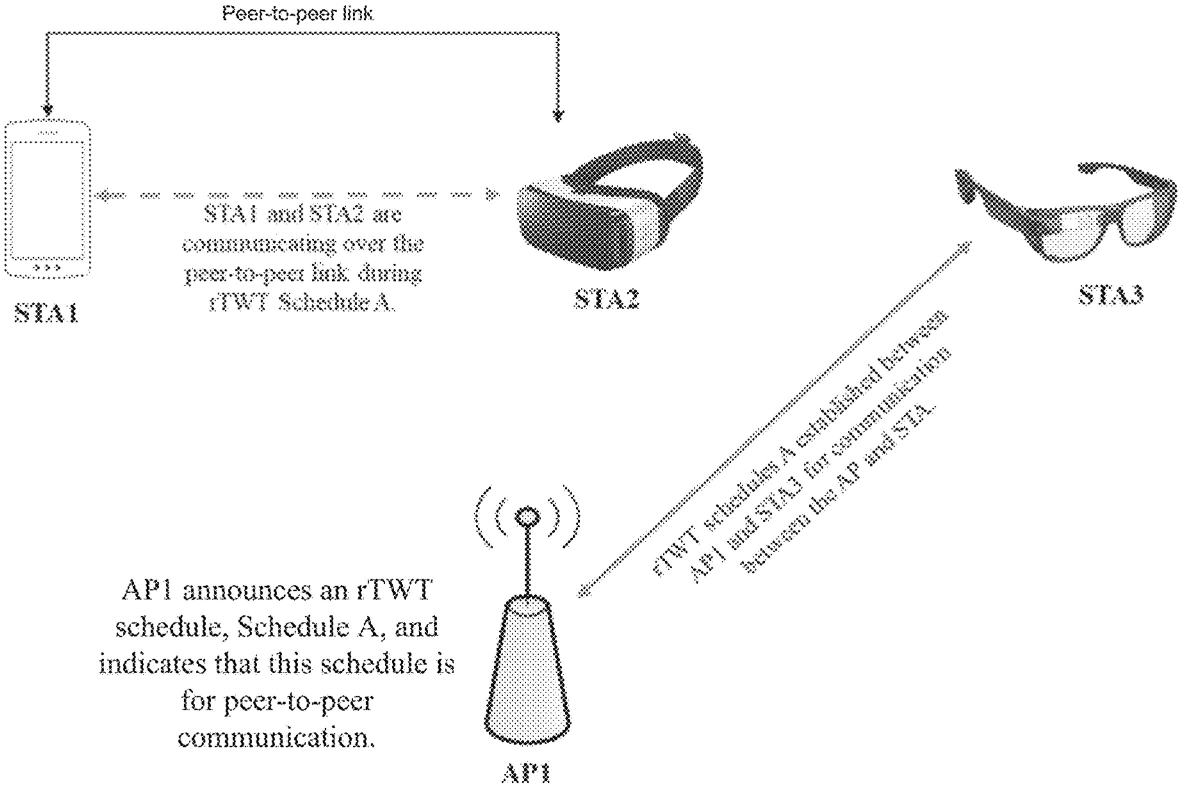
FIG. 6 illustrates an example scenario in which restricted TWT is used both for peer-to-peer communication and for uplink/downlink communication between a scheduling AP and a scheduled STA according to various embodiments of the present disclosure.

FIG. 6 illustrates an example scenario in which restricted TWT is used both for peer-to-peer communication and for uplink/downlink communication between a scheduling AP and a scheduled STA according to various embodiments of the present disclosure.

In the example of FIG. 6, AP1 announces a restricted TWT schedule (Negotiation Type subfield set to 2), Schedule A, in its BSS and indicates that this schedule is both for peer-to-peer communication and for uplink/downlink communication. In the BSS, STA1 and STA2 are a pair of STAs that have established a peer-to-peer link between themselves. Neither of these two STAs establishes the restricted TWT schedule (Schedule A) with AP1. STA3 is another STA in the BSS that establishes membership of the Schedule A (e.g., as a restricted TWT scheduled STA).

During the restricted TWT SP corresponding to Schedule A, all three STAs (STA1, STA2, and STA3) ignore the Quiet element sent by AP1 to protect the restricted TWT SP corresponding to Schedule A. During the restricted TWT SP, STA1 and STA2 can exchange traffic over the peer-to-peer link. Moreover, STA3 can exchange latency-sensitive traffic with AP1 during the restricted TWT SP corresponding to Schedule A.

According to one embodiment, for the case where a restricted TWT schedule can be used for peer-to-peer communication in addition to uplink/downlink communication, in order to ensure fairness among other STAs in the BSS, if a pair of peer-to-peer STAs are done with transmitting latency-sensitive traffic over the peer-to-peer link before the end of the restricted TWT SP, the pair of peer-to-peer STAs are prohibited from transmitting (e.g., exchanging latency-tolerant traffic) for the remaining portion of that restricted TWT SP.

According to other embodiments in this case, if the pair of peer-to-peer STAs are done with transmitting latency-sensitive traffic over the peer-to-peer link before the end of the restricted TWT SP, the pair of peer-to-peer STAs can transmit latency-tolerant traffic over the peer-to-peer link for the remainder of the restricted TWT SP. This will improve the channel utilization of the peer-to-peer link.

According to yet other embodiments in this case, if the pair of peer-to-peer STAs are done with transmitting latency-sensitive traffic over the peer-to-peer link before the end of the restricted TWT SP, and if the remaining duration of the SP is less than a predefined threshold, then the peer-to-peer STAs will not transmit for the remaining duration of the SP. If the remaining duration of the SP is greater than a predefined threshold, however, then the peer-to-peer STAs can continue exchange latency-tolerant traffic for the remaining duration of the SP.

According to some embodiments, whether or not a restricted TWT schedule is available for use by peer-to-peer STAs for communication over the peer-to-peer link can be indicated by the Peer-to-Peer subfield in the Request Type field in a Broadcast TWT Parameter Set corresponding to a restricted TWT schedule.

FIG. 7 illustrates an example of a Request Type field format in a Broadcast TWT Parameter Set field with a Peer-to-Peer subfield according to various embodiments of the present disclosure. If the Peer-to-Peer subfield is set to 1, it indicates that the corresponding restricted TWT schedule is available for use by peer-to-peer STAs for communication over the peer-to-peer link. If the Peer-to-Peer subfield is set to 0, it indicates that the corresponding restricted TWT schedule cannot be used by peer-to-peer STAs for communication over the peer-to-peer link.

According to some other embodiments, whether or not a restricted TWT schedule can be used by peer-to-peer STAs for communication over the peer-to-peer link in addition to uplink/downlink communication can be indicated by the Broadcast TWT Recommendation field value in the Request Type field in a Broadcast TWT Parameter Set field corresponding to the restricted TWT schedule. This is shown in Table 1. According to some embodiments, if the Broadcast TWT Recommendation field value is set to 5, it would indicate that the corresponding broadcast TWT schedule is a restricted TWT schedule and the restricted TWT schedule can also be used by peer-to-peer STAs for communication over the peer-to-peer link. According to some other embodiments, this indication can also be made by other values (value 6 and value 7).

TABLE 1

| Broadcast TWT Recommendation field value | Description when transmitted in a broadcast TWT element |
|---|---|
| 0 | No constraints on the frames transmitted during a broadcast TWT SP |
| 1 | Frames transmitted during a broadcast TWT SP by a TWT scheduled STA are recommended to be limited to solicited status and solicited feedback:<br>PS-Poll and QoS Null frames<br>Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.)<br>Feedback in an HE TB feedback NDP, if solicited by the AP (see 26.5.7 (NDP feedback report procedure))<br>BQRs (see 26.5.6 (Bandwidth query report operation))<br>BSRs (see 26.5.5 (Buffer status report operation))<br>Frames that are sent as part of a sounding feedback exchange (see 26.7 (HE sounding protocol))<br>Management frames: Action or Action No Ack frames<br>Control response frames<br>Trigger frames transmitted by the TWT scheduling AP during the broadcast TWT SP do not contain RUs for random access (see 26.8.3.2 (Rules for TWT scheduling AP) and 26.5.4 (UL OFDMA-based random access (UORA))), otherwise, there are no other restrictions on the frames transmitted by the TWT scheduling AP. |
| 2 | Frames transmitted during a broadcast TWT SP by a TWT scheduled STA are recommended to be limited to solicited status and solicited feedback:<br>PS-Poll and QoS Null frames<br>Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.)<br>BQRs (see 26.5.6 (Bandwidth query report operation))<br>BSRs (see 26.5.5 (Buffer status report operation))<br>Frames that are sent as part of a sounding feedback exchange (see 26.7 (HE sounding protocol))<br>Management frames: Action, Action No Ack frames or (Re)Association Request<br>Control response frames<br>Trigger frames transmitted by the TWT scheduling AP during the broadcast TWT SP contain at least one RU for random access (see 26.8.3.2 (Rules for TWT scheduling AP) and 26.5.4 (UL OFDMA-based random access (UORA))), otherwise there are no restrictions onthe frames transmitted by the TWT scheduling AP. |

TABLE 1-continued

| Broadcast TWT Recommendation field value | Description when transmitted in a broadcast TWT element |
|---|---|
| 3 | No constraints on the frames transmitted during a broadcast TWT SP except that the AP transmits a TIM frame or a FILS Discovery frame including a TIM element at the beginning of each TWT SP (see 26.14.3.2 (AP operation for opportunistic power save)). |
| 4 | Reserved |
| 5 | Corresponding Broadcast TWT SP is a restricted TWT SP and can be used by peer-to-peer STAs for communication over the peer-to-peer link. |
| 6-7 | Reserved |

According to some other embodiments, whether or not a restricted TWT schedule can be used by peer-to-peer STAs for communication over the peer-to-peer link in addition to uplink/downlink communication can be indicated by a Peer-to-Peer Restricted TWT subfield in a Broadcast TWT Info subfield in a Broadcast TWT Parameter Set corresponding to the restricted TWT schedule.

FIG. 8 illustrates an example of a Broadcast TWT Info subfield format in a Broadcast TWT Parameter Set field with a Peer-to-Peer Restricted TWT subfield according to various embodiments of the present disclosure. If the Peer-to-Peer Restricted TWT subfield is set to 1, it would indicate that the corresponding restricted TWT schedule can be used by peer-to-peer STAs for communication over the peer-to-peer link in addition to uplink/downlink communication. If the Peer-to-Peer Restricted TWT subfield is set to 0, it indicates that the corresponding restricted TWT schedule cannot be used by the peer-to-peer STAs for communication over the peer-to-peer link. The Peer-to-Peer Restricted TWT subfield can also be indicated by Bit 2 (B2) of the Broadcast TWT Info subfield.

In some embodiments, when a restricted TWT schedule is used by peer-to-peer STAs for communication over the peer-to-peer link, in order to ensure that the schedule is only used for latency-sensitive traffic, the AP can indicate the allowed Traffic Identifiers (TIDs) for which the peer-to-peer STAs can use the restricted TWT schedule for communication over the peer-to-peer link. The AP can make this indication by including a TID bitmap in the Broadcast TWT Parameter Set corresponding to the restricted TWT schedule. According to some embodiments, a Restricted TWT Peer-to-Peer TID Bitmap subfield in a Broadcast TWT Parameter Set field can indicate the TIDs for which peer-to-peer STAs can use the corresponding restricted TWT for communication over peer-to-peer link.

FIG. 9 illustrates an example of a Broadcast TWT Parameter Set field format with a Restricted TWT Peer-to-Peer TID Bitmap subfield according to various embodiments of the present disclosure. If the $k^{th}$ bit in the Restricted TWT Peer-to-Peer TID Bitmap subfield is set to 0, it indicates that the corresponding TID is not allowed to be communicated over the peer-to-peer link by peer-to-peer STAs using the restricted TWT schedule. If the $k^{th}$ bit in the Restricted TWT Peer-to-Peer TID Bitmap subfield is set to 1, it indicates that the corresponding TID is allowed to be communicated over the peer-to-peer link by peer-to-peer STAs using the restricted TWT schedule.

According to one embodiment, whether or not the Restricted TWT Peer-to-Peer TID Bitmap subfield is present in the Broadcast TWT Parameter Set field can be indicated by an rTWT Peer-to-Peer TID Bitmap Present subfield in the Request Type field in a Broadcast TWT Parameter Set field corresponding to the restricted TWT schedule included in a broadcast TWT element.

FIG. 10 illustrates an example of a Request Type field format in a Broadcast TWT Parameter Set field including a rTWT Peer-to-Peer TID Bitmap Present subfield according to various embodiments of the present disclosure. If the bit corresponding to the rTWT Peer-to-Peer TID Bitmap Present field is set to 1, it indicates that the Restricted TWT Peer-to-Peer TID Bitmap subfield is present in the Broadcast TWT Parameter Set field. If the bit corresponding to the rTWT Peer-to-Peer TID Bitmap Present field is set to 0, it indicates that the Restricted TWT Peer-to-Peer TID Bitmap subfield is not present in the Broadcast TWT Parameter Set field.

According to some other embodiments, whether or not the Restricted TWT Peer-to-Peer TID Bitmap subfield is present in the Broadcast TWT Parameter Set field can be indicated by a Restricted TWT Peer-to-Peer TID Bitmap Present subfield in the Broadcast TWT Info subfield in a Broadcast TWT Parameter Set field corresponding to the restricted TWT schedule included in a broadcast TWT element.

FIG. 11 illustrates an example of a Broadcast TWT Info subfield format in a Broadcast TWT Parameter Set field with a Restricted TWT Peer-to-Peer TID Bitmap Present subfield according to various embodiments of the present disclosure. If the bit corresponding to the Restricted TWT Peer-to-Peer TID Bitmap Present field is set to 1, it indicates that the Restricted TWT Peer-to-Peer TID Bitmap subfield is present in the Broadcast TWT Parameter Set field. If the bit corresponding to the Restricted TWT Peer-to-Peer TID Bitmap Present field is set to 0, it indicates that the Restricted TWT Peer-to-Peer TID Bitmap subfield is not present in the Broadcast TWT Parameter Set field. Bit 1 (B1) in the Broadcast TWT Info subfield can also be used to make this indication, in which case the Peer-to-Peer Restricted TWT subfield would be represented by Bit 2 (B2) in the Broadcast TWT Info subfield.

According to some embodiments, a Restricted TWT Peer-to-Peer TID Bitmap subfield in a Restricted TWT Traffic Info field in a Broadcast TWT Parameter Set field corresponding to the restricted TWT schedule can indicate the TIDs for which Peer-to-Peer STAs can use the corresponding restricted TWT for communication over Peer-to-Peer link (see FIG. 10 and FIG. 11).

FIG. 12 illustrates an example of a Broadcast TWT Parameter Set field format with a Restricted TWT Traffic Info subfield according to various embodiments of the present disclosure. FIG. 13 illustrates an example of a Restricted TWT Traffic Info field format with a Restricted TWT Peer-to-Peer TID Bitmap according to various embodiments of the present disclosure. If the $k^{th}$ bit in the Restricted TWT Peer-to-Peer TID Bitmap subfield is set to 1, it indicates that the corresponding TID is allowed for Peer-to-Peer STAs to communicate over the Peer-to-Peer link using the restricted TWT schedule. If the $k^{th}$ bit in the Restricted TWT Peer-to-Peer TID Bitmap subfield is set to 0, it indicates that the corresponding TID is not allowed for Peer-to-Peer STAs to communicate over the Peer-to-Peer link using the restricted TWT schedule.

According to one embodiment, if a restricted TWT scheduling AP allows a restricted TWT schedule to be used by peer-to-peer STAs for communication over the peer-to-peer links, during the corresponding restricted TWT SP, the AP monitors the peer-to-peer channels over which the peer-to-peer STAs communicate during the restricted TWT SP. According to one such embodiment, whether or not a pair of peer-to-peer STAs are transmitting latency-tolerant traffic over the peer-to-peer link during a restricted TWT SP can be determined by observing the Restricted TWT Peer-to-Peer TID Bitmap or rTWT Peer-to-Peer TID Bitmap fields.

According to one embodiment, for the case where a restricted TWT scheduling AP allows a restricted TWT schedule to be used by peer-to-peer STAs for communication over the peer-to-peer links, if the restricted TWT scheduling AP detects that the peer-to-peer STAs are transmitting latency-tolerant traffic during the restricted TWT SP, the restricted TWT scheduling AP can terminate the corresponding restricted TWT SP for the corresponding peer-to-peer STAs. According to some embodiments, in such a scenario the restricted TWT scheduling AP can send a notification frame to the peer-to-peer STAs that are transmitting latency-tolerant traffic over the peer-to-peer link during the restricted TWT SP. Such a notification frame (or element) can be used to indicate to those peer-to-peer STAs that they cannot use the restricted TWT SP for peer-to-peer communication anymore. According to some embodiments, such a notification frame could be a Restricted TWT P2P SP Termination frame. Table 2 illustrates an example format of a Restricted TWT P2P SP Termination frame.

TABLE 2

| Order | Information |
|---|---|
| 1 | Category |
| 2 | EHT Action |
| 3 | Dialog Token |
| 4 | Restricted TWT |

The Restricted TWT element in the Restricted TWT P2P SP Termination frame contains the Restricted TWT Parameter Set field corresponding to the restricted TWT schedule corresponding to the restricted TWT SP that the restricted TWT scheduling AP would like to terminate for the peer-to-peer STAs that are transmitting latency-tolerant traffic over the peer-to-peer link. Other frame formats may also be used for this purpose.

According to some embodiments, upon receiving a Restricted TWT P2P SP Termination frame during a restricted TWT SP, the peer-to-peer STAs stop communication over the peer-to-peer link during the remainder of the restricted TWT SP but can continue using the restricted TWT SP for uplink/downlink communication with the corresponding restricted TWT scheduling AP if the STAs have established the restricted TWT schedule for uplink/downlink communication with the corresponding restricted TWT scheduling AP. According to another embodiment, if any of the peer-to-peer STAs have also established the restricted TWT schedule for uplink/downlink communication with the corresponding restricted TWT scheduling AP, upon receiving a Restricted TWT P2P SP Termination frame during a restricted TWT SP, such STAs would also stop communication with the respective restricted TWT scheduling AP during the remainder of the restricted TWT SP along with communication over the peer-to-peer links.

According to some embodiments, the size of Restricted TWT Peer-to-Peer TID Bitmap or rTWT Peer-to-Peer TID Bitmap field is two octets. According to this embodiment, the 16 bits in the Restricted TWT Peer-to-Peer TID Bitmap or rTWT Peer-to-Peer TID Bitmap field will correspond to the 16 possible TID values defined in the standards.

According to another embodiment, the size of the Restricted TWT Peer-to-Peer TID Bitmap or rTWT Peer-to-Peer TID Bitmap field is one octet. According to this embodiment, the 8 bits in the Restricted TWT Peer-to-Peer TID Bitmap or rTWT Peer-to-Peer TID Bitmap field will correspond to the first 8 of the 16 TID values defined in the standards.

According to one embodiment, a restricted TWT scheduling AP, when advertising a restricted TWT schedule, can indicate whether or not the restricted TWT schedule is allowed to be used for peer-to-peer communication. In such a case, the same restricted TWT schedule can be used by peer-to-peer STAs for communication over the peer-to-peer link as well as by the non-peer-to-peer STAs for uplink/downlink communication. According to one embodiment, even though the restricted TWT schedule is indicated to be allowed for peer-to-peer communication, in order to use the restricted TWT schedule for peer-to-peer communication, a peer-to-peer STA still needs to go through restricted TWT negotiation with the associated restricted TWT scheduling AP and establish the restricted TWT schedule on the corresponding link between the peer-to-peer STA and the associated restricted TWT scheduling AP.

In such a case, according to one embodiment, only one of the peer-to-peer STAs in a pair of peer-to-peer STAs needs to establish the restricted TWT schedule with the associated restricted TWT scheduling AP before the pair of peer-to-peer STAs can use the restricted TWT schedule for peer-to-peer communication. According to another embodiment, both of the peer-to-peer STAs in the pair need to establish the restricted TWT schedule with the associated restricted TWT scheduling AP before the pair of peer-to-peer STAs can use the restricted TWT schedule for peer-to-peer communication.

Figure 14:
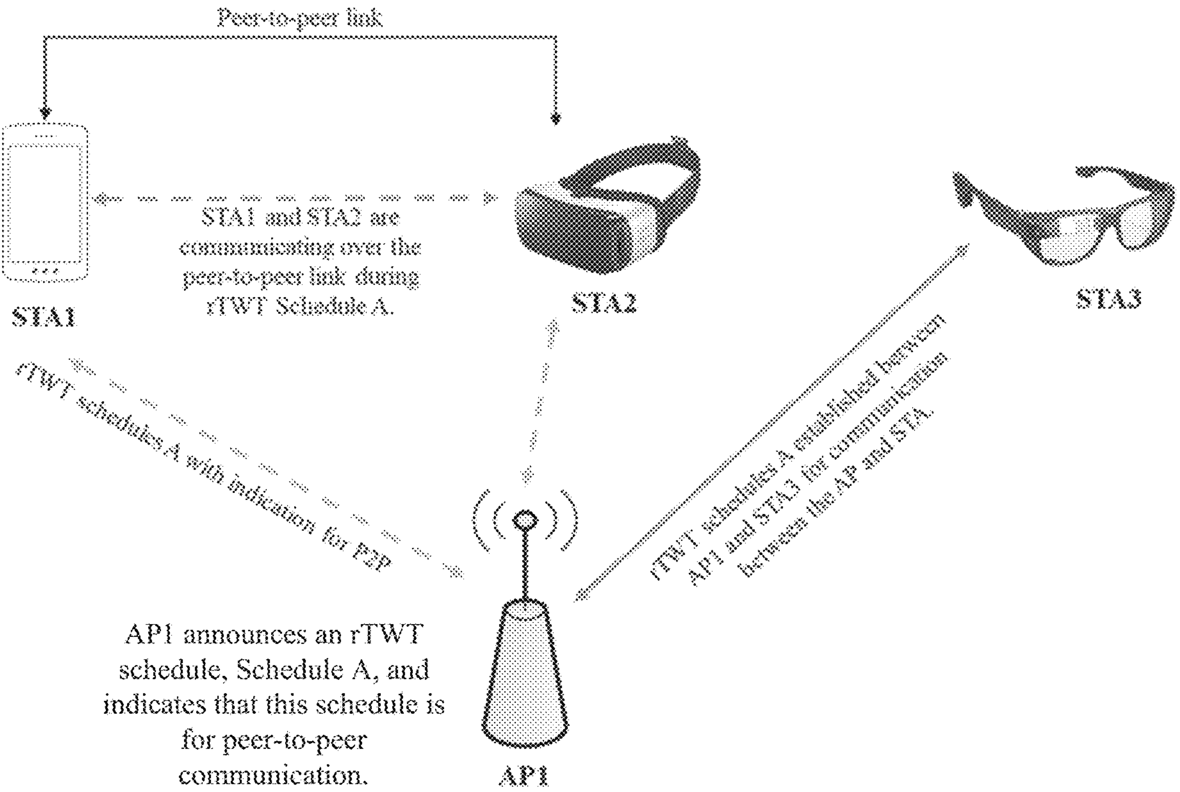
FIG. 14 illustrates an example scenario in which restricted TWT is used both for peer-to-peer communication and for uplink/downlink communication between a scheduling AP and a scheduled STA according to various embodiments of the present disclosure.

FIG. 14 illustrates an example scenario in which restricted TWT is used both for peer-to-peer communication and for uplink/downlink communication between a scheduling AP and a scheduled STA according to various embodiments of the present disclosure. FIG. 14 illustrates a similar scenario to that of FIG. 6, except that both peer-to-peer STAs of a pair establish the restricted TWT schedule with the associated restricted TWT scheduling AP before using the restricted TWT schedule to exchange peer-to-peer traffic.

In the example of FIG. 14, AP1 announces a restricted TWT schedule (Negotiation Type subfield set to 2), Schedule A, in its BSS and indicates that this schedule is allowed for peer-to-peer communication. In the BSS, STA1 and STA2 are a pair of STAs that have established a peer-to-peer link between themselves. STA1 negotiates with the restricted TWT scheduling AP, AP1, for restricted TWT Schedule A, and establishes restricted TWT Schedule A with AP1 on the corresponding link. Likewise, STA2 negotiates with the restricted TWT scheduling AP, AP1, for restricted TWT Schedule A, and establishes restricted TWT Schedule A with AP1 on the corresponding link.

STA3 is another STA in the BSS that establishes membership of the Schedule A with AP1. During the restricted TWT SP corresponding to Schedule A, all three STAs (STA1, STA2, and STA3) ignore the Quiet element sent by AP1 to protect the restricted TWT SP corresponding to Schedule A. During the restricted TWT SP, STA1 and STA2 can communicate over the peer-to-peer link. Moreover, STA3 can communicate latency-sensitive UL/DL traffic with AP1 during the restricted TWT SP corresponding to Schedule A.

According to one embodiment, a restricted TWT scheduling AP, when advertising a restricted TWT schedule, can indicate whether or not the restricted TWT schedule is only for peer-to-peer communication. According to this embodiment, if a restricted TWT schedule is indicated to be only for peer-to-peer communication, non-peer-to-peer STAs in the BSS cannot establish membership of this restricted TWT schedule for UL/DL communication with their associated AP. According to one embodiment, even though a restricted TWT schedule is indicated to be only for peer-to-peer communication, in order to use the restricted TWT schedule for peer-to-peer communication, a peer-to-peer STA still needs to go through restricted TWT negotiation with the associated restricted TWT scheduling AP and establish the restricted TWT schedule on the corresponding link between the peer-to-peer STA and the associated restricted TWT scheduling AP.

In such a case, according to one embodiment, only one of the peer-to-peer STAs in a pair of peer-to-peer STAs needs to establish the restricted TWT schedule with the associated restricted TWT scheduling AP before the pair of peer-to-peer STAs can use the restricted TWT schedule for peer-to-peer communication. According to another embodiment, both of the peer-to-peer STAs in the pair need to establish the restricted TWT schedule with the associated restricted TWT scheduling AP before the pair of peer-to-peer STAs can use the restricted TWT schedule for peer-to-peer communication.

Figure 15:
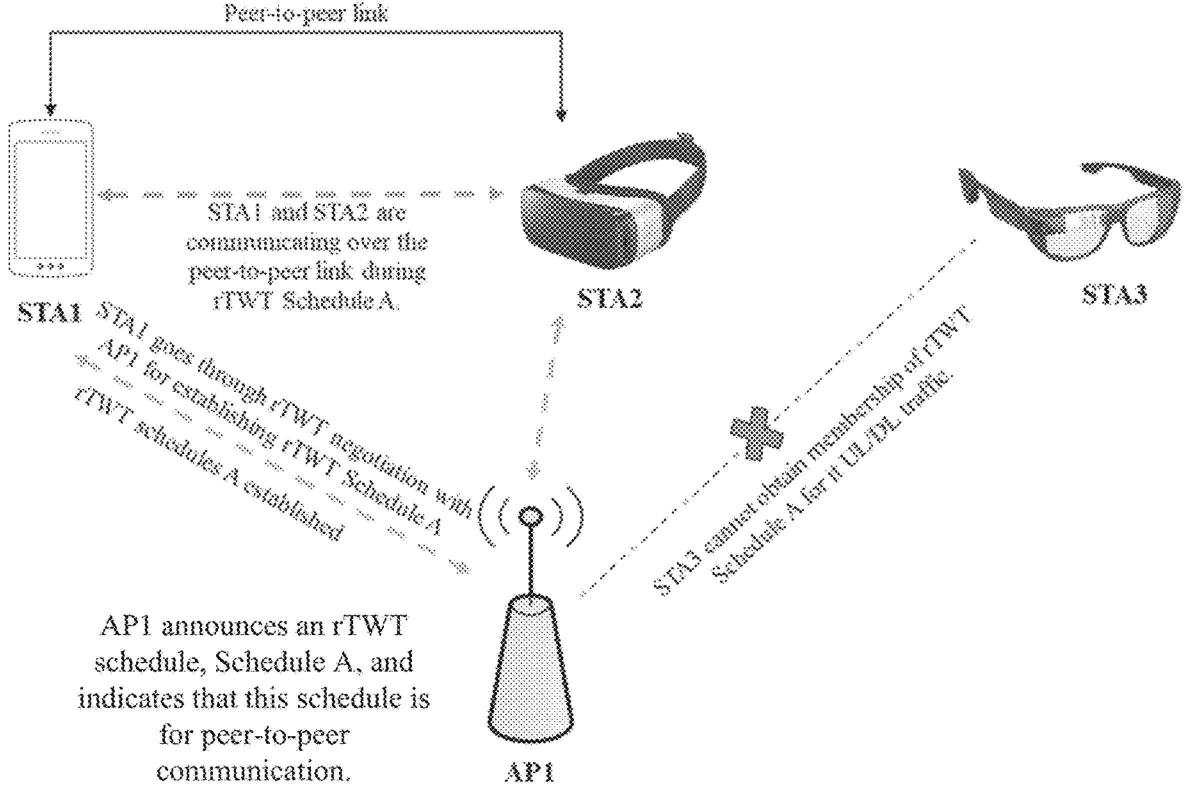
FIG. 15 illustrates an example scenario in which restricted TWT is used for peer-to-peer communication according to various embodiments of the present disclosure.

FIG. 15 illustrates an example scenario in which restricted TWT is used for peer-to-peer communication according to various embodiments of the present disclosure. FIG. 15 illustrates a similar scenario to that of FIG. 14, except that STA3, a non peer-to-peer STA, cannot establish membership of the restricted TWT schedule that is indicated to be only for peer-to-peer communication.

According to one embodiment, whether or not a particular restricted TWT schedule is not allowed to be used for peer-to-peer communication, or is allowed to be used both for peer-to-peer communication and for UL/DL communication, or is allowed to be used only for peer-to-peer communication, can be indicated by a P2P for rTWT subfield in a Broadcast TWT Info subfield in a Restricted TWT Parameter Set field in a Broadcast TWT element.

FIG. 16 illustrates an example of a Broadcast TWT Info subfield including a P2P for rTWT subfield according to various embodiments of the present disclosure. The encoding of the P2P for rTWT subfield is shown in Table 3.

TABLE 3

| Value | Encoding |
|---|---|
| 00 | The restricted TWT schedule is not allowed for peer-to-peer communication, and is only for UL/DL communication. |
| 01 | The restricted TWT schedule is allowed for peer-to-peer communication along with UL/DL communication. |
| 10 | The restricted TWT schedule is only allowed for peer-to-peer communication, and is not allowed for UL/DL communication. |
| 4 | Reserved |

According to another embodiment, whether or not a particular restricted TWT schedule is not allowed to be used for peer-to-peer communication, or is allowed to be used both for peer-to-peer communication and for UL/DL communication, or is allowed to be used only for peer-to-peer communication, can be indicated by the Broadcast TWT Recommendation field in a Request Type field in a Broadcast TWT Parameter Set. Values for the Broadcast TWT Recommendation field in such a case are shown in Table 4.

TABLE 4

| Broadcast TWT Recommendation field value | Description when transmitted in a broadcast TWT element |
|---|---|
| 0 | No constraints on the frames transmitted during a broadcast TWT SP |
| 1 | Frames transmitted during a broadcast TWT SP by a TWT scheduled STA are recommended<br>to be limited to solicited status and solicited feedback:<br>PS-Poll and QoS Null frames<br>Feedback can be contained in the QoS Control field or in the HE variant HT Control<br>field of the frame, if either is present (see 26.5.2 (UL MU operation), 26.9 (Operating<br>mode indication), 26.13 (Link adaptation using the HLA Control subfield), etc.)<br>Feedback in an HE TB feedback NDP, if solicited by the AP (see 26.5.7 (NDP feedback<br>report procedure))<br>BQRs (see 26.5.6 (Bandwidth query report operation))<br>BSRs (see 26.5.5 (Buffer status report operation))<br>Frames that are sent as part of a sounding feedback exchange (see |

TABLE 4-continued

| Broadcast TWT Recommendation field value | Description when transmitted in a broadcast TWT element |
| --- | --- |
| | 26.7 (HE sounding protocol)) Management frames: Action or Action No Ack frames Control response frames Trigger frames transmitted by the TWT scheduling AP during the broadcast TWT SP do not contain RUs for random access (see 26.8.3.2 (Rules for TWT scheduling AP) and 26.5.4 (UL OFDMA-based random access (UORA))), otherwise, there are no other restrictions on the frames transmitted by the TWT scheduling AP. |
| 2 | Frames transmitted during a broadcast TWT SP by a TWT scheduled STA are recommended to be limited to solicited status and solicited feedback: PS-Poll and QoS Null frames Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.) BQRs (see 26.5.6 (Bandwidth query report operation)) BSRs (see 26.5.5 (Buffer status report operation)) Frames that are sent as part of a sounding feedback exchange (see 26.7 (HE sounding protocol)) Management frames: Action, Action No Ack frames or (Re)Association Request Control response frames Trigger frames transmitted by the TWT scheduling AP during the broadcast TWT SP contain at least one RU for random access (see 26.8.3.2 (Rules for TWT scheduling AP) and 26.5.4 (UL OFDMA-based random access (UORA))), otherwise there are no restrictions on the frames transmitted by the TWT scheduling AP. |
| 3 | No constraints on the frames transmitted during a broadcast TWT SP except that the AP transmits a TIM frame or a FILS Discovery frame including a TIM element at the beginning of each TWT SP (see 26.14.3.2 (AP operation for opportunistic power save)). |
| 4 | Corresponding Broadcast TWT SP is a restricted TWT SP and the restricted TWT schedule is not allowed for peer-to-peer communication, and is only for UL/DL communication. |
| 5 | Corresponding Broadcast TWT SP is a restricted TWT SP and the restricted TWT schedule is allowed for peer-to-peer communication along with UL/DL communication. |
| 6 | Corresponding Broadcast TWT SP is a restricted TWT SP and the restricted TWT schedule is only allowed for peer-to-peer communication, and is not allowed for UL/DL communication. |
| 7 | Reserved. |

Another variation of values for the Broadcast TWT Recommendation field in such a case is shown in Table 5.

TABLE 5

| Broadcast TWT Recommendation field value | Description when transmitted in a broadcast TWT element |
| --- | --- |
| 0 | No constraints on the frames transmitted during a broadcast TWT SP |
| 1 | Frames transmitted during a broadcast TWT SP by a TWT scheduled STA are recommended to be limited to solicited status and solicited feedback: PS-Poll and QoS Null frames Feedback can be contained in the QoS Control field or in the HE variant HT Control field of the frame, if either is present (see 26.5.2 (UL MU operation), 26.9 |

TABLE 5-continued

| Broadcast TWT Recommendation field value | Description when transmitted in a broadcast TWT element |
|---|---|
| | (Operating mode indication), 26.13 (Link adaptation using the HLA Control subfield), etc.)<br>Feedback in an HE TB feedback NDP, if solicited by the AP (see 26.5.7 (NDP feedback report procedure))<br>BQRs (see 26.5.6 (Bandwidth query report operation))<br>BSRs (see 26.5.5 (Buffer status report operation))<br>Frames that are sent as part of a sounding feedback exchange (see 26.7 (HE sounding protocol))<br>Management frames: Action or Action No Ack frames<br>Control response frames<br>Trigger frames transmitted by the TWT scheduling AP during the broadcast TWT SP do not contain RUs for random access (see 26.8.3.2 (Rules for TWT scheduling AP) and 26.5.4 (UL OFDMA-based random access (UORA))), otherwise, there are no other restrictions on the frames transmitted by the TWT scheduling AP. |
| 2 | Frames transmitted during a broadcast TWT SP by a TWT scheduled STA are recommended to be limited to solicited status and solicited feedback:<br>PS-Poll and QoS Null frames<br>Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.)<br>BQRs (see 26.5.6 (Bandwidth query report operation))<br>BSRs (see 26.5.5 (Buffer status report operation))<br>Frames that are sent as part of a sounding feedback exchange (see 26.7 (HE sounding protocol))<br>Management frames: Action, Action No Ack frames or (Re)Association Request<br>Control response frames<br>Trigger frames transmitted by the TWT scheduling AP during the broadcast TWT SP contain at least one RU for random access (see 26.8.3.2 (Rules for TWT scheduling AP) and 26.5.4 (UL OFDMA-based random access (UORA))), otherwise there are no restrictions on the frames transmitted by the TWT scheduling AP. |
| 3 | No constraints on the frames transmitted during a broadcast TWT SP except that the AP transmits a TIM frame or a FILS Discovery frame including a TIM element at the beginning of each TWT SP (see 26.14.3.2 (AP operation for opportunistic power save)). |
| 4 | Reserved |
| 5 | Corresponding Broadcast TWT SP is a restricted TWT SP and the restricted TWT schedule is not allowed for peer-to-peer communication, and is only for UL/DL communication. |
| 6 | Corresponding Broadcast TWT SP is a restricted TWT SP and the restricted TWT schedule is allowed for peer-to-peer communication along with UL/DL communication. |
| 7 | Corresponding Broadcast TWT SP is a restricted TWT SP and the restricted TWT schedule is only allowed for peer-to-peer communication, and is not allowed for UL/DL communication. |

FIG. 17 illustrates an example of a Broadcast TWT Info subfield format according to various embodiments of the present disclosure. FIG. 18 illustrates an example of a Restricted TWT Traffic Info field according to various embodiments of the present disclosure. According to some embodiments, the Restricted TWT Traffic Info field is present in a Restricted TWT Parameter Set field if the Restricted TWT Traffic Info Present subfield of the Broadcast TWT Info subfield is set to 1.

FIG. 19 illustrates an example of a Traffic Info Control field format according to various embodiments of the present disclosure. According to some embodiments, the DL TID Bitmap Valid subfield indicates if the Restricted TWT DL TID Bitmap field has valid information. When the value is set to 0, it indicates that DL traffic of all TIDs is identified as latency-sensitive traffic, and the Restricted TWT DL TID Bitmap field is reserved. The UL TID Bitmap Valid subfield indicates if the Restricted TWT UL TID Bitmap field has valid information. When the value is set to 0, it indicates that UL traffic of all TIDs is identified as latency-sensitive traffic, and the Restricted TWT UL TID Bitmap field is reserved.

According to one embodiment, a restricted TWT schedule can be designated as only for use for peer-to-peer communication by changing the above definition of DL TID Bitmap Valid and UL TID Bitmap Valid subfields.

According to one such embodiment, if both the DL TID Bitmap Valid and UL TID Bitmap Valid subfields are set to 0, and if it has also been indicated (using any of the previous embodiments) that the restricted TWT schedule allows peer-to-peer STAs to use the restricted TWT schedule for communication over the peer-to-peer link, then it would be interpreted that this particular restricted TWT schedule is allowed to be used only for peer-to-peer communication over the peer-to-peer link, and no uplink/downlink transmission is allowed in this restricted TWT schedule.

According to another such embodiment, if a P2P Only subfield in a Traffic Info Control field is set to 1 and if it has also been indicated that the restricted TWT schedule allows peer-to-peer STAs to use the restricted TWT schedule for communication over the peer-to-peer link, then it would be interpreted that this particular restricted TWT schedule is allowed to be used only for peer-to-peer communication over the peer-to-peer link, and no uplink/downlink transmission is allowed in this restricted TWT schedule.

FIG. 20 illustrates another example of a Traffic Info Control field format according to various embodiments of the present disclosure. According to this embodiment, if the P2P Only field is set to 1, then DL TID Bitmap Valid and UL TID Bitmap Valid subfields can be ignored.

According to one embodiment, in order to indicate that a restricted TWT SP corresponding to a restricted TWT schedule is only for peer-to-peer communication, the restricted TWT scheduling AP, during the restricted TWT schedule negotiation, sets all bits in the Restricted TWT DL TID Bitmap and Restricted TWT UL TID Bitmap subfields in the corresponding Restricted TWT Parameter Set field equal to 0.

According to another embodiment, in order to indicate that a restricted TWT SP corresponding to a restricted TWT schedule is only for peer-to-peer communication, the restricted TWT scheduling AP, during the restricted TWT schedule negotiation, sets the Peer-to-Peer Only subfield in the Traffic Control field of the corresponding Restricted TWT Parameter Set field to 1. Otherwise, the Peer-to-Peer Only subfield is set to 0. The corresponding format of the Traffic Info field is shown in FIG. 21.

Figure 21:
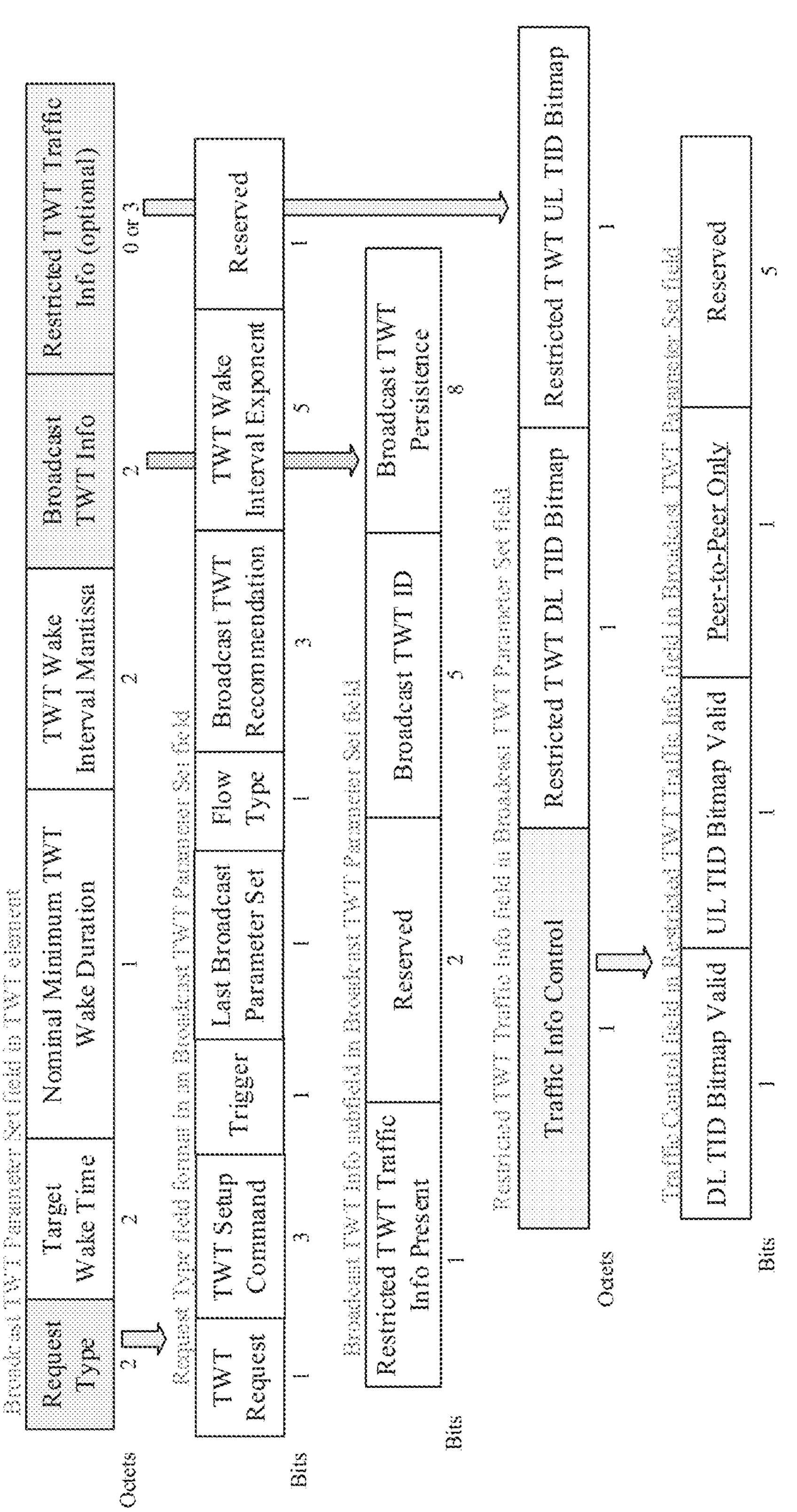
FIG. 21 illustrates another example of a Traffic Info Control field format according to various embodiments of the present disclosure.

FIG. 21 illustrates another example of a Traffic Info Control field format according to various embodiments of the present disclosure.

According to one embodiment, if both the restricted TWT scheduling AP and restricted TWT scheduled STA support Triggered TXOP Sharing Mode 2, and if Trigger frames are addressed to the restricted TWT scheduled STA by the AP in a trigger-enabled restricted TWT SP that allows peer-to-peer communication during the restricted TWT SP, then the restricted TWT scheduling AP shall send at least one MU-RTS TXS Trigger frame with TXOP Sharing Mode subfield set to 2 during the restricted TWT SP.

According to another embodiment, if both the restricted TWT scheduling AP and restricted TWT scheduled STA support Triggered TXOP Sharing Mode 2, and if Trigger frames are addressed to the restricted TWT scheduled STA by the restricted TWT scheduling AP in a trigger-enabled restricted TWT SP that allows peer-to-peer communication during the restricted TWT SP, then the restricted TWT scheduling AP shall ensure that at least the first trigger frame sent during the restricted TWT SP is an MU-RTS TXS Trigger frame with TXOP Sharing Mode subfield set to 2.

According to another embodiment, if both the restricted TWT scheduling AP and restricted TWT scheduled STA support Triggered TXOP Sharing Mode 2, and if Trigger frames are addressed to the restricted TWT scheduled STA by the restricted TWT scheduling AP in a trigger-enabled restricted TWT SP that allows peer-to-peer communication during the restricted TWT SP, the restricted TWT scheduling AP should not allocate TXOP, through MU-RTS TXS Trigger frame with TXOP Sharing Mode subfield set to 2, to the restricted TWT scheduled STA that exceeds the restricted TWT SP duration.

According to another embodiment, if both the restricted TWT scheduling AP and restricted TWT scheduled STA support Triggered TXOP Sharing Mode 2, and if Trigger frames are addressed to the restricted TWT scheduled STA by the restricted TWT scheduling AP in a trigger-enabled restricted TWT SP that allows only peer-to-peer communication during the restricted TWT SP (e.g., by setting the Peer-to-Peer subfield to 1), then the restricted TWT scheduling AP shall ensure all the trigger frame sent during the restricted TWT SP are MU-RTS TXS Trigger frames with TXOP Sharing Mode subfield set to 2.

According to another embodiment, if both the restricted TWT scheduling AP and restricted TWT scheduled STA support Triggered TXOP Sharing Mode 2, and if Trigger frames are addressed to the restricted TWT scheduled STA by the restricted TWT scheduling AP in a trigger-enabled restricted TWT SP that allows only peer-to-peer communication during the restricted TWT SP (e.g., by setting the Peer-to-Peer subfield to 1), the restricted TWT scheduled STA can start P2P communication regardless of whether or not the trigger frame sent by the restricted TWT scheduling AP during the restricted TWT SP is an MU-RTS TXS Trigger frames with TXOP Sharing Mode subfield set to 2 or regardless of whether or not any trigger frame is transmitted during the restricted TWT SP.

According to another embodiment, the restricted TWT scheduled STA may not need to wait for a trigger frame reception if the corresponding restricted TWT SP is only for P2P communication.

As discussed above, restricted TWT is a type of broadcast TWT operation, and broadcast TWT operation enables an AP and a STA to establish one or more broadcast TWT schedules between themselves. Some mechanisms and frameworks are defined herein for establishing broadcast TWT schedules for peer-to-peer communication, e.g. between TDLS peer STAs.

According to one embodiment, in order to establish broadcast TWT schedules between TDLS peer STAs, at least one of the TDLS peer STAs first needs to establish a broadcast TWT schedule with an associated AP. That STA then, when setting up a TDLS direct link, includes a broadcast TWT element in the TDLS Setup Request frame that the STA sends to another TDLS peer STA.

According to one embodiment, the TWT element included in the TDLS Setup Request frame contains the same set of Broadcast TWT Parameter Sets that were included in the TWT element used in setting up the broadcast TWT schedule between that TDLS initiating STA and the AP. According to another embodiment, the TWT element included in the TDLS Setup Request frame contains any subset of Broadcast TWT Parameter Sets that were included in the TWT element used in setting up the broadcast TWT schedule between that TDLS initiating STA and the AP.

If the responding TDLS peer STA accepts the TDLS setup request sent by the TDLS initiating STA, and if subsequently a TDLS direct link is established between the two TDLS peer STAs, the broadcast TWT schedule is also established between the TDLS peer STAs as a power saving mechanism for communication over the TDLS direct link.

Figure 22:
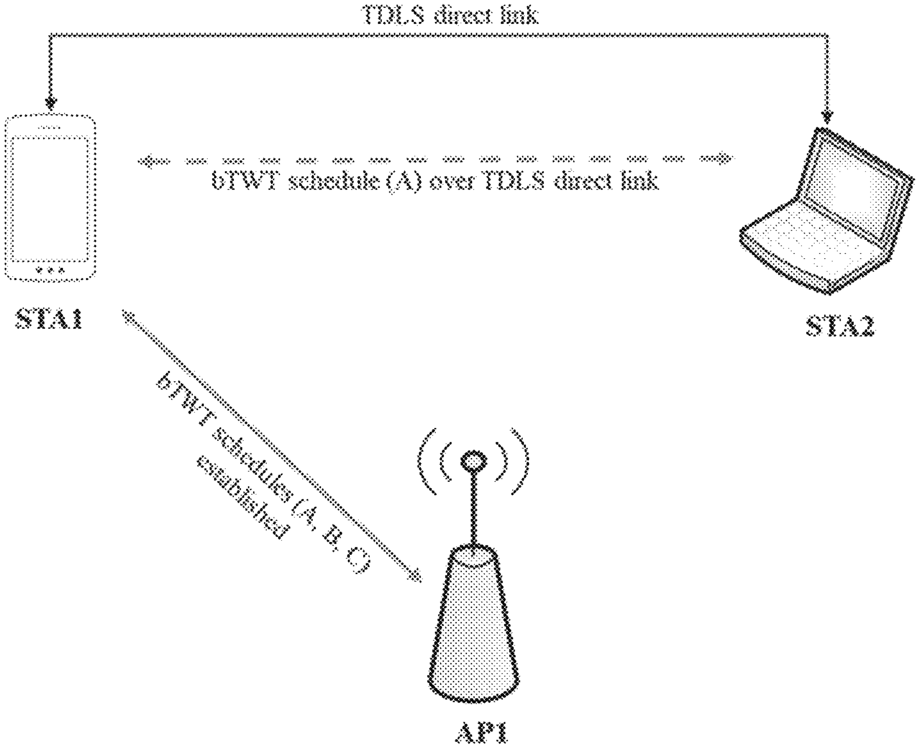
FIG. 22 illustrates an example scenario of broadcast TWT schedule establishment over a TDLS direct link according to various embodiments of the present disclosure.

FIG. 22 illustrates an example scenario of broadcast TWT schedule establishment over a TDLS direct link according to various embodiments of the present disclosure. In this example, one TDLS peer STA establishes the broadcast TWT schedule with the associated AP.

In FIG. 22, STA1 and STA2 are two STAs associated with an AP, AP1. AP1 announces broadcast TWT schedules in its BSS and STA1 establishes membership of three such broadcast TWT schedules: Schedule A, Schedule B, and Schedule C.

STA1 then moves on to establish a TDLS direct link with STA2. STA1 sends a TDLS Setup Request frame to STA2, and includes a broadcast TWT element within the TDLS Setup Request frame. In the TWT element, STA1 includes a Broadcast TWT Parameter Set that corresponds to Schedule A.

STA2, upon receiving the TDLS Setup Request frame from STA1, sends a TDLS Setup Response frame that includes a broadcast TWT element. The broadcast TWT element sent by STA2 in the TDLS Setup Response frame also contains the Broadcast TWT Parameter Set that corresponds to Schedule A.

Subsequently, a TDLS direct link is established between STA1 and STA2 and a broadcast TWT schedule, Schedule A, is set up for the two TDLS peer STAs to communicate over the TDLS direct link.

Figure 23:
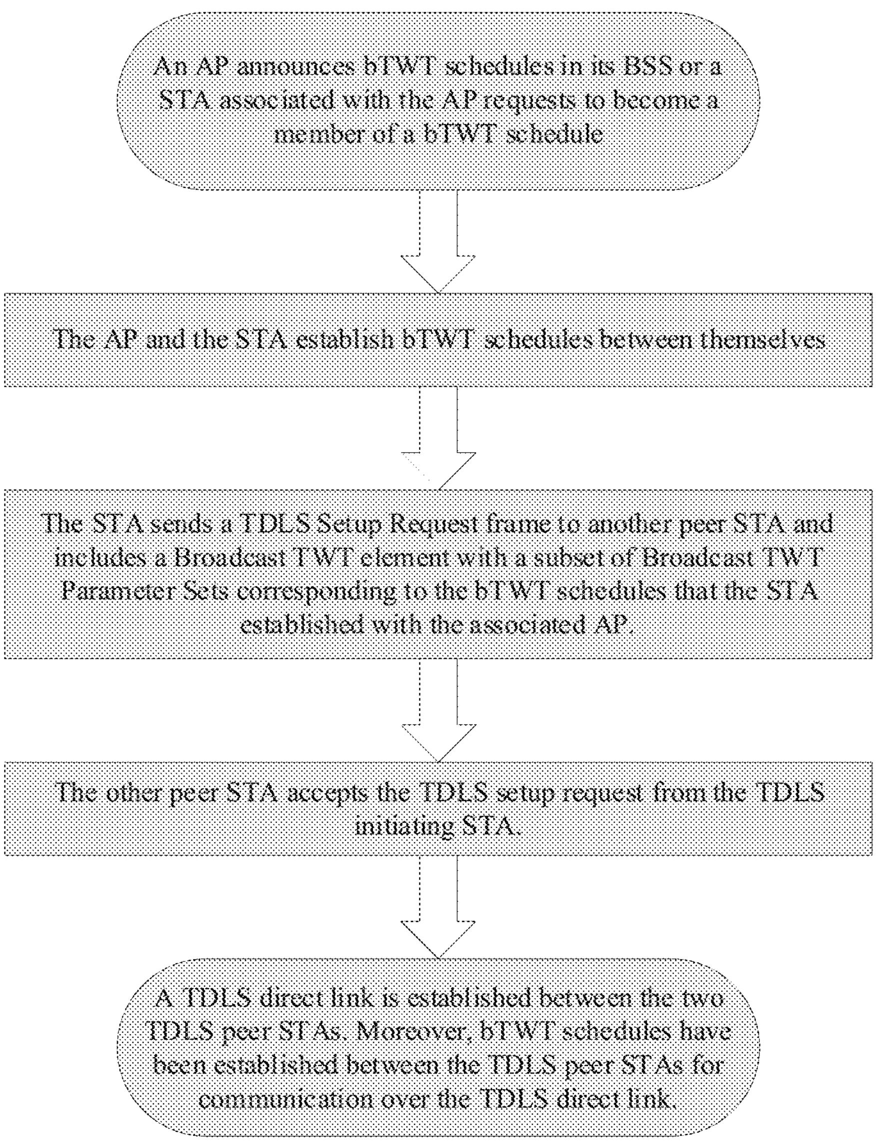
FIG. 23 illustrates a flowchart of an example process of broadcast TWT schedule establishment over a TDLS direct link according to various embodiments of the present disclosure.

FIG. 23 illustrates a flowchart of an example process of broadcast TWT schedule establishment over a TDLS direct link according to various embodiments of the present disclosure. The example process of FIG. 23 corresponds to the scenario of FIG. 22, in which only one TDLS peer STA in a pair need establish a broadcast TWT schedule with its associated AP before setting up the broadcast TWT schedule on the TDLS direct link.

According to another embodiment, in order to establish broadcast TWT schedules between a pair of TDLS peer STAs, both of the TDLS peer STAs in the pair first need to establish broadcast TWT schedules with the associated AP. The TDLS initiating STA, when setting up a TDLS direct link, includes a broadcast TWT element in the TDLS Setup Request frame that the STA sends to another TDLS peer STA. The TWT element can contain any subset of Broadcast TWT Parameter Set corresponding to broadcast TWT schedules the initiating STA has established with the associated AP.

If the responding TDLS peer STA intends to accept the TDLS setup request from the initiating TDLS peer STA with the requested broadcast TWT schedules, the responding TDLS peer STA first checks if there are any common broadcast TWT schedules between the set of schedules requested by the initiating TDLS peer STA and the set of schedules that the responding TDLS peer STA has established with the associated AP. If there are any common broadcast TWT schedules between these two sets of broadcast TWT schedules, then the TDLS responding peer STA includes the Broadcast TWT Parameter Sets corresponding to these schedules in a broadcast TWT element and includes the broadcast TWT element in the TDLS Setup Response frame sent to the initiating TDLS peer STA.

Subsequently, a TDLS direct link is established between the two TDLS peer STAs and the common broadcast TWT schedules are established for communication between the TDLS peer STAs over the TDLS direct link.

Figure 24:
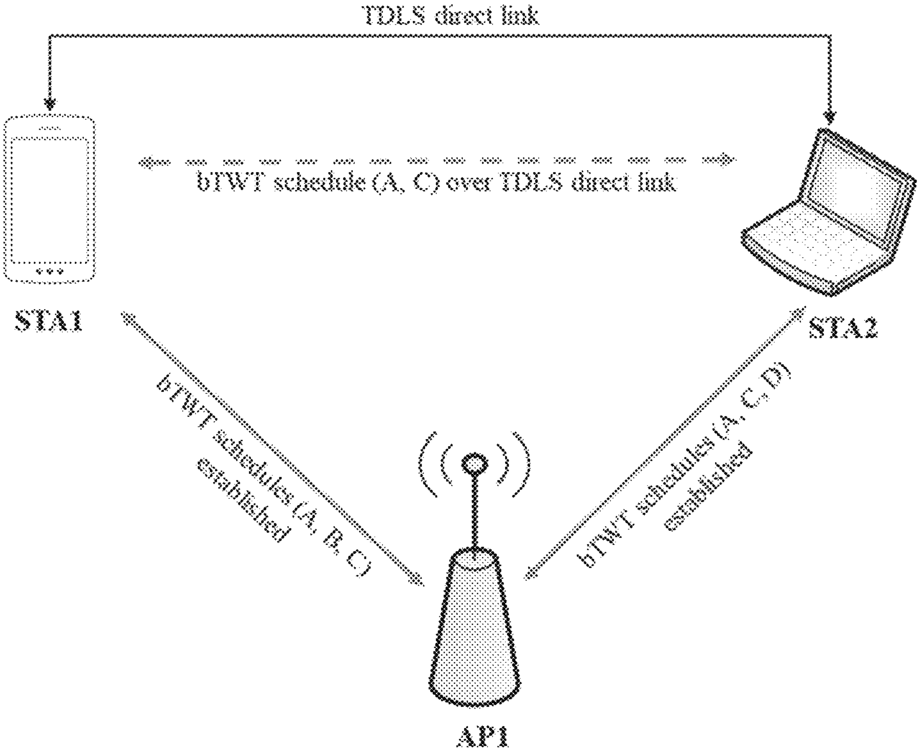
FIG. 24 illustrates another example scenario of broadcast TWT schedule establishment over a TDLS direct link according to various embodiments of the present disclosure.

FIG. 24 illustrates another example scenario of broadcast TWT schedule establishment over a TDLS direct link according to various embodiments of the present disclosure. In this example, both TDLS peer STAs establish the broadcast TWT schedule with the associated AP.

In FIG. 24, STA1 and STA2 are two STAs associated with an AP, AP1. AP1 announces broadcast TWT schedules in its BSS. STA1 establishes membership of three such broadcast TWT schedules: Schedule A, Schedule B, and Schedule C. Moreover, STA2 also establishes membership of three broadcast TWT schedules with AP1: Schedule A, Schedule C, and Schedule D.

STA1 then moves on to establish a TDLS direct link with STA2. STA1 sends a TDLS Setup Request frame to STA2, and includes a broadcast TWT element within the TDLS Setup Request frame. In the TWT element, STA1 includes three Broadcast TWT Parameter Sets that correspond to Schedule A, Schedule B, and Schedule C.

STA2, upon receiving the TDLS Setup Request frame from STA1, sends a TDLS Setup Response frame that includes a broadcast TWT element. The broadcast TWT element sent by STA2 in the TDLS Setup Response contains two Broadcast TWT Parameter Sets that correspond to Schedule A and Schedule C (the responding TDLS peer STA (STA2) does not include Schedule B in the TDLS Setup Response frame since STA2 has no Schedule B established with AP1).

Subsequently, a TDLS direct link is established between STA1 and STA2 and two broadcast TWT schedules, Schedule A and Schedule C, are set up for the two TDLS peer STAs to communicate over the TDLS direct link.

Figure 25:
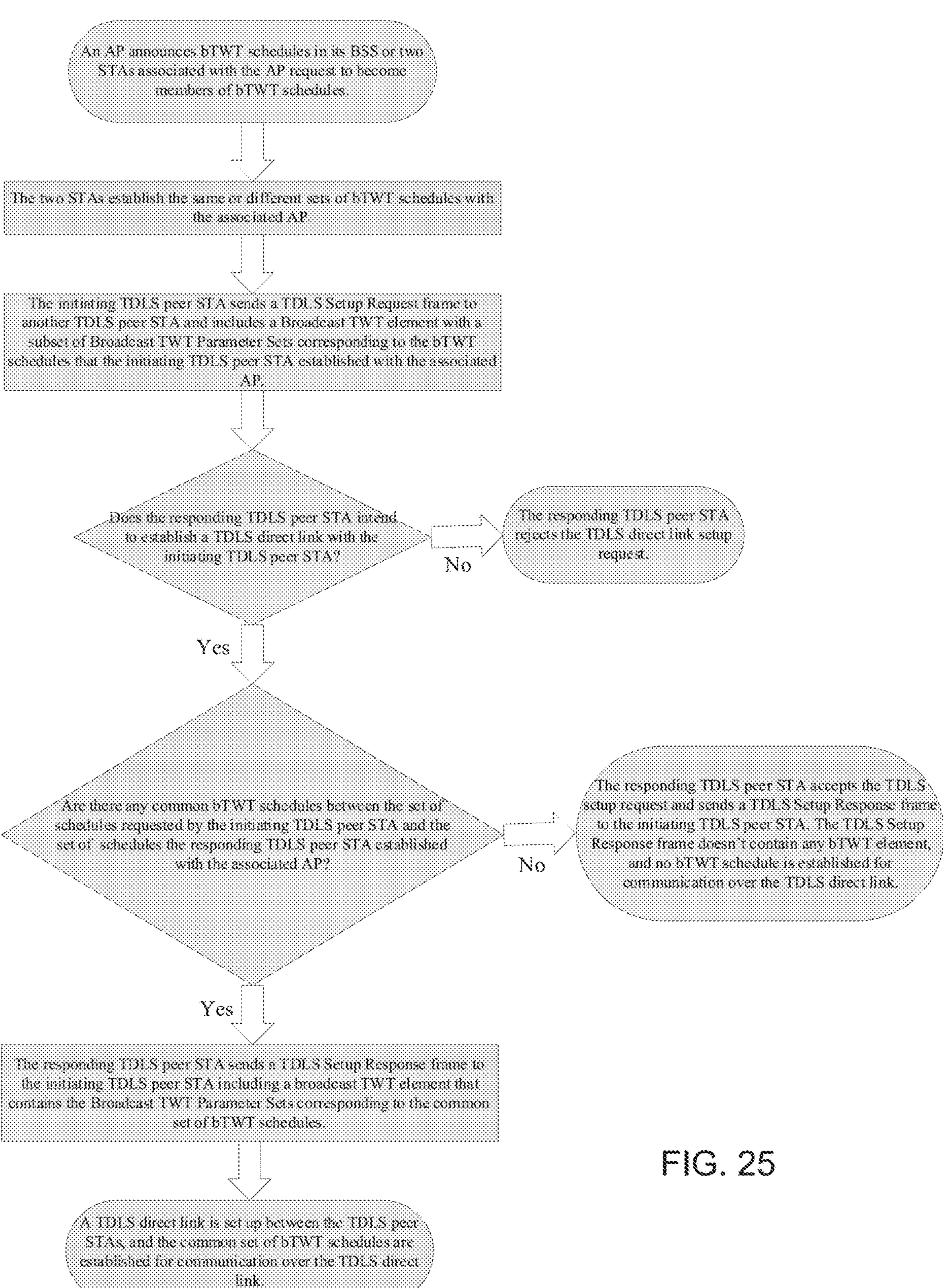
FIG. 25 illustrates a flowchart of an example process of broadcast TWT schedule establishment over a TDLS direct link according to various embodiments of the present disclosure.

FIG. 25 illustrates a flowchart of an example process of broadcast TWT schedule establishment over a TDLS direct link according to various embodiments of the present disclosure. The example process of FIG. 25 corresponds to the scenario of FIG. 24, in which both TDLS peer STAs in a pair need to establish broadcast TWT schedules with their associated AP before setting up the broadcast TWT schedules on the TDLS direct link.

According to one embodiment, once one or more broadcast TWT schedules have been established between two TDLS peer STAs for communication over the TDLS direct link, if there is any change in the corresponding broadcast TWT schedules that either of the TDLS peer STAs have established with the associated AP (e.g., the scenario where the AP changes the TWT wake time, wake interval, or termination time through changing the values in the Broadcast TWT Persistence subfield in the Broadcast TWT Info subfield within the Broadcast TWT Parameter Set field), the broadcast TWT schedules established between the TDLS peer STA are not affected. According to another embodiment, whenever there is any change in the corresponding broadcast TWT schedules that either of the TDLS peer STAs have established with the associated AP, the change is also reflected in the corresponding broadcast TWT schedules established between the TDLS peer STA for communication over the TDLS direct link. According to this embodiment, both TDLS peer STAs can receive a beacon frame from the associated AP.

According to some embodiments, in order to establish one or more broadcast TWT schedules between TDLS peer STAs for communication over the TDLS direct link, neither of the TDLS peer STAs need to have the same broadcast TWT schedule set up with the associated AP—i.e. the AP's involvement is not necessary. According to this embodiment, in order to establish one or more broadcast TWT schedules between TDLS peer STAs, the TDLS initiating peer STA includes a broadcast TWT element in the TDLS Setup Request frame. The initiating STA does not need to have established any broadcast TWT schedules with its associated AP. Similarly, the responding TDLS peer STA also does not need to have established any broadcast TWT schedules with its associated AP in order to accept the TDLS setup request with the requested broadcast TWT schedules.

According to certain embodiments, when setting up broadcast TWT schedules between two TDLS peer STAs, one of the TDLS peer STAs can be referred to as the B-TWT Controlling TDLS peer STA and the other TDLS peer STA can be referred to as the B-TWT Controlled TDLS peer STA. For broadcast TWT operation between two TDLS peer STAs for communication over the TDLS direct link, the B-TWT Controlling TDLS peer STA can assume the role of a TWT Scheduling AP and the B-TWT Controlled TDLS peer STA can assume the role of a TWT Scheduled STA. All the mechanisms and rules defined for broadcast TWT operation between a TWT Scheduling AP and a TWT Scheduled STA can be applied to broadcast TWT operation between a B-TWT Controlling TDLS peer STA and a B-TWT Controlled TDLS peer STA, respectively.

According to some embodiments, a broadcast TWT schedule set up between two TDLS peer STAs according to any of the above embodiments can also be a restricted TWT schedule. According to one such embodiment, in order for one TDLS peer STA to establish a restricted TWT schedule with another TDLS peer STA, only one of the two TDLS peer STA needs to establish the same restricted TWT schedule with the associated AP. According to another such embodiment, in order for one TDLS peer STA to establish a restricted TWT schedule with another TDLS peer STA, both TDLS peer STAs need to establish the same restricted TWT schedule with their associated AP.

During the TDLS setup process, if the TDLS Setup Request frame contains a broadcast TWT element with one or more Restricted TWT Parameter Sets, it would indicate that the TDLS initiating STA intends to establish restricted TWT schedules (along with other broadcast TWT schedules, if any) to communicate with the corresponding TDLS peer STA. If the TDLS Setup Response frame also contains a broadcast TWT element containing a subset of restricted TWT schedules requested by the TDLS initiating STA, it would indicate that a TDLS link is set up (once the responding STA receives a TDLS Setup Confirmation frame) where the TDLS peer STAs may use that subset of restricted TWT schedules for communication over the TDLS direct link.

According to some other embodiments, when announcing a restricted TWT schedule, a TWT scheduling AP may indicate whether the restricted TWT schedule may also be used by TDLS peer STAs. According to this embodiment, the same restricted TWT schedule may be shared between (i) both TDLS peer STAs for communication over the TDLS direct link, or (ii) the TWT scheduling AP and TWT scheduled STAs (that are also TDLS peer STAs) for communication between the TWT scheduling AP and the TWT scheduled STAs.

According to one embodiment, once one or more restricted TWT schedules have been established between two TDLS peer STAs for communication over the TDLS direct link, if there is any change in the corresponding restricted TWT schedules that either of the TDLS peer STAs have established with the associated AP (e.g., the scenario where the AP changes the TWT wake time, wake interval, or termination time through changing the values in Broadcast TWT Persistence subfield in Broadcast TWT Info subfield within the Broadcast TWT Parameter Set field corresponding to the restricted TWT schedule), the change is also reflected in the restricted TWT schedule established between the two TDLS peer STAs. For instance, in the event where a restricted TWT schedule between a TDLS peer STA and the associated AP is torn down, if the TDLS peer STA had the same restricted TWT schedule established with another TDLS peer STA for communication over the TDLS direct link, that restricted TWT schedule between the TDLS peer STAs would also be torn down.

In order to improve TDLS channel utilization and ensure fairness among the TWT scheduled STAs which are members of the restricted TWT schedule (either for communication over TDLS direct link or communication between TWT scheduling AP and TWT scheduled STA), the restricted TWT SP is terminated for the TDLS direct link when the TDLS peer STAs are done transmitting latency-sensitive traffic over the TDLS direct link earlier than the restricted TWT SP end time.

According to some embodiments, during a restricted TWT schedule, the AP with which the TDLS peer STAs are associated monitors the channel. If the AP detects that either of the TDLS peer STAs is transmitting latency-tolerant traffic using a restricted TWT schedule, the AP can terminate the corresponding restricted TWT schedule for the TDLS peer STAs.

According to some embodiments, whether or not a restricted TWT schedule can also be used by TDLS peer STAs for communication over the TDLS direct link can be indicated by a Peer-to-Peer subfield in a Request Type field in a Broadcast TWT Parameter Set corresponding to a restricted TWT schedule.

Figures 26, 27, 28, 29:
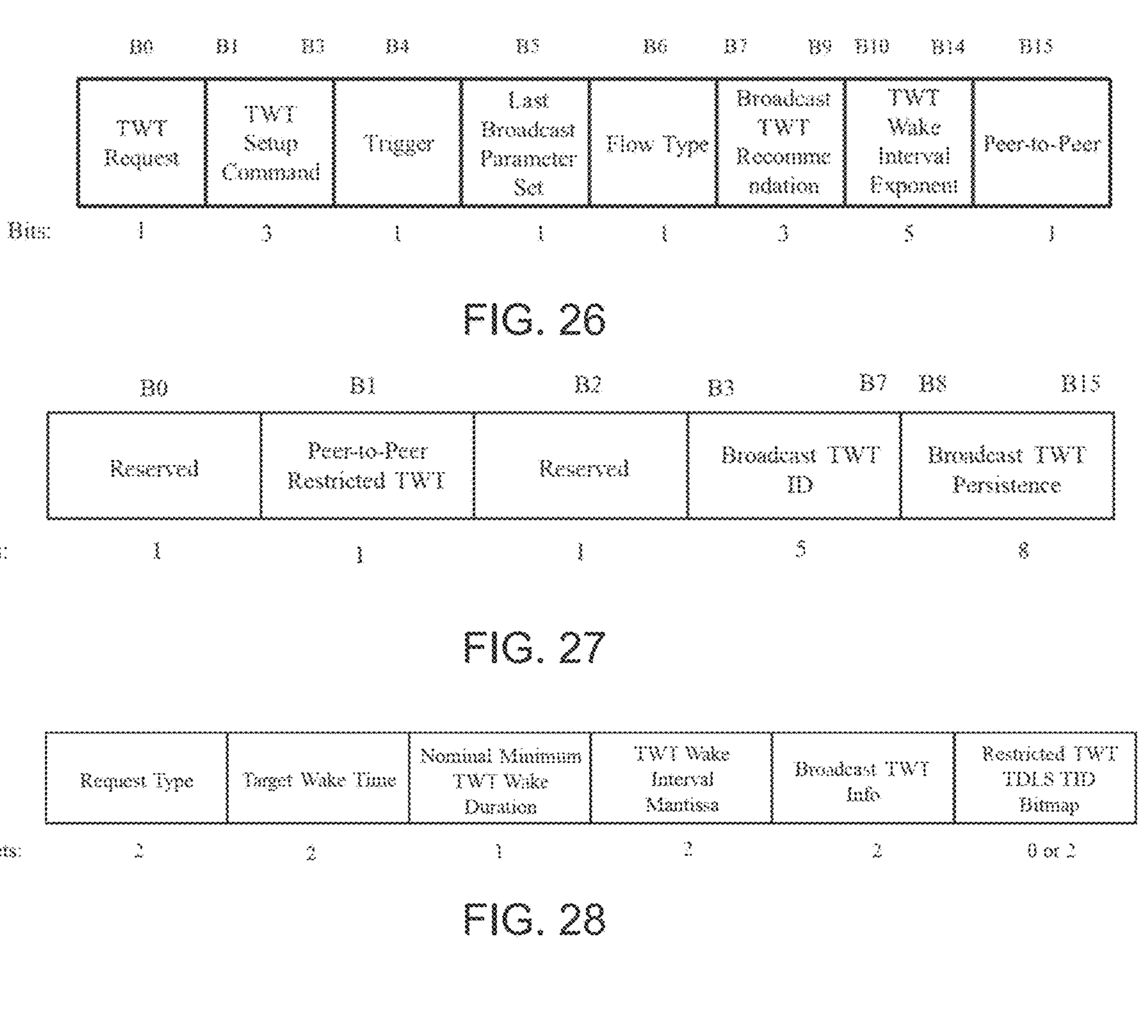
FIG. 26 illustrates an example of a Request Type field format in a Broadcast TWT Parameter Set field with a Peer-to-Peer subfield according to various embodiments of the present disclosure.
FIG. 27 illustrates an example of a Broadcast TWT Info subfield format in a Broadcast TWT Parameter Set field with a Peer-to-Peer Restricted TWT subfield according to various embodiments of the present disclosure.
FIG. 28 illustrates an example of a Broadcast TWT Parameter Set field format with a Restricted TWT TDLS TID Bitmap subfield according to various embodiments of the present disclosure.
FIG. 29 illustrates an example of a Request Type field format in a Broadcast TWT Parameter Set field including an rTWT TDLS TID Bitmap Present subfield according to various embodiments of the present disclosure.

FIG. 26 illustrates an example of a Request Type field format in a Broadcast TWT Parameter Set field with a Peer-to-Peer subfield according to various embodiments of the present disclosure. If the Peer-to-Peer subfield is set to 1, it indicates that the corresponding restricted TWT schedule can be used by the TDLS peer STAs for communication over the TDLS direct link. If the Peer-to-Peer subfield is set to 0, it indicates that the corresponding restricted TWT schedule cannot be used by the TDLS peer STAs for communication over the TDLS direct link.

According to some other embodiments, whether or not a restricted TWT schedule can also be used by TDLS peer STAs for communication over the TDLS direct link can be indicated by a Broadcast TWT Recommendation field value in the Request Type field in a Broadcast TWT Parameter Set field corresponding to the restricted TWT schedule. Table 6 shows possible values of the Broadcast TWT Recommendation field.

TABLE 6

| Broadcast TWT Recommendation field value | Description when transmitted in a broadcast TWT element |
|---|---|
| 0 | No constraints on the frames transmitted during a broadcast TWT SP |
| 1 | Frames transmitted during a broadcast TWT SP by a TWT scheduled STA are recommended to be limited to solicited status and solicited feedback: PS-Poll and QoS Null frames Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.) Feedback in an HE TB feedback NDP, if solicited by the AP (see 26.5.7 (NDP feedback report procedure)) BQRs (see 26.5.6 (Bandwidth query report operation)) BSRs (see 26.5.5 (Buffer status report operation)) Frames that are sent as part of a sounding feedback exchange (see 26.7 (HE sounding protocol)) Management frames: Action or Action No Ack frames Control response frames Trigger frames transmitted by the TWT scheduling AP during the broadcast TWT SP do not contain RUs for random access (see 26.8.3.2 (Rules for TWT scheduling AP) and 26.5.4 (UL OFDMA-based random access (UORA))), otherwise, there are no other restrictions on the frames transmitted by the TWT scheduling AP. |
| 2 | Frames transmitted during a broadcast TWT SP by a TWT scheduled STA are recommended to be limited to solicited status and solicited feedback: PS-Poll and QoS Null frames Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.) BQRs (see 26.5.6 (Bandwidth query report operation)) BSRs (see 26.5.5 (Buffer status report operation)) Frames that are sent as part of a sounding feedback exchange (see 26.7 (HE sounding protocol)) Management frames: Action, Action No Ack frames or (Re)Association Request Control response frames Trigger frames transmitted by the TWT scheduling AP during the broadcast TWT SP contain at least one RU for random access (see 26.8.3.2 (Rules for TWT scheduling AP) and 26.5.4 (UL OFDMA-based random access (UORA))), otherwise there are no restrictions on the frames transmitted by the TWT scheduling AP. |
| 3 | No constraints on the frames transmitted during a broadcast TWT SP except that the AP transmits a TIM frame or a FILS Discovery frame including a TIM element at the beginning of each TWT SP (see 26.14.3.2 (AP operation for opportunistic power save)). |
| 4 | Reserved |
| 5 | Corresponding Broadcast TWT SP is a restricted TWT SP and can be used by TDLS peer STAs for communication over the TDLS link. |
| 6-7 | Reserved |

According to some other embodiments, whether or not a restricted TWT schedule can also be used by TDLS peer STAs for communication over the TDLS direct link can be indicated by a Peer-to-Peer Restricted TWT subfield in a Broadcast TWT Info subfield in a Broadcast TWT Parameter Set corresponding to the restricted TWT schedule.

FIG. 27 illustrates an example of a Broadcast TWT Info subfield format in a Broadcast TWT Parameter Set field with a Peer-to-Peer Restricted TWT subfield according to various embodiments of the present disclosure. If the Peer-to-Peer Restricted TWT subfield is set to 1, it would indicate that the corresponding restricted TWT schedule can also be used by the TDLS peer STAs for communication over the TDLS link. If the Peer-to-Peer Restricted TWT subfield is set to 0, it indicates that the corresponding restricted TWT schedule cannot be used by the TDLS peer STAs for communication over the TDLS link. The Peer-to-Peer Restricted TWT subfield can also be indicated by Bit 2 (B2) of the Broadcast TWT Info subfield.

If a restricted TWT schedule is used by TDLS peer STAs for communication over the TDLS direct link, in order to ensure that the schedule is only used for latency-sensitive traffic, the AP can indicate the allowed Traffic Identifiers (TIDs) for which the TDLS peer STAs can use the restricted TWT schedule for communication over the TDLS link. The AP can make this indication by including a TID bitmap in the Broadcast TWT Parameter Set corresponding to the restricted TWT schedule.

According to some embodiments, a Restricted TWT TDLS TID Bitmap subfield in a Broadcast TWT Parameter Set field can indicate the TIDs for which TDLS peer STAs can use the corresponding restricted TWT schedule for communication over TDLS link.

FIG. 28 illustrates an example of a Broadcast TWT Parameter Set field format with a Restricted TWT TDLS TID Bitmap subfield according to various embodiments of the present disclosure. If the $k^{th}$ bit in the Restricted TWT TDLS TID Bitmap subfield is set to 0, it indicates that the corresponding TID is not allowed for TDLS peer STAs to communicate over the TDLS link using the restricted TWT schedule. If the $k^{th}$ bit in the Restricted TWT TDLS TID Bitmap subfield is set to 1, it indicates that the corresponding TID is allowed for TDLS peer STAs to communicate over the TDLS link using the restricted TWT schedule.

According to one embodiment, whether or not the Restricted TWT TDLS TID Bitmap subfield is present in a Broadcast TWT Parameter Set field can be indicated by an rTWT TDLS TID Bitmap Present subfield in the Request Type field in a Broadcast TWT Parameter Set field corresponding to the restricted TWT schedule included in a broadcast TWT element.

FIG. 29 illustrates an example of a Request Type field format in a Broadcast TWT Parameter Set field including an rTWT TDLS TID Bitmap Present subfield according to various embodiments of the present disclosure. If the bit corresponding to the rTWT TDLS TID Bitmap Present field is set to 1, it indicates that the Restricted TWT TDLS TID Bitmap subfield is present in the Broadcast TWT Parameter Set field. If the bit corresponding to the rTWT TDLS TID Bitmap Present field is set to 0, it indicates that the Restricted TWT TDLS TID Bitmap subfield is not present in the Broadcast TWT Parameter Set field.

According to some other embodiments, whether or not the Restricted TWT TDLS TID Bitmap subfield is present in a Broadcast TWT Parameter Set field can be indicated by a Restricted TWT TDLS TID Bitmap Present subfield in the Broadcast TWT Info subfield in a Broadcast TWT Parameter Set field corresponding to the restricted TWT schedule included in a broadcast TWT element.

Figures 30, 31, 32:
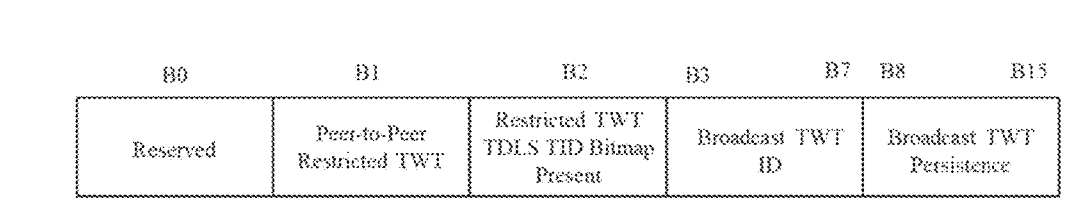
FIG. 30 illustrates an example of a Broadcast TWT Info subfield format in a Broadcast TWT Parameter Set field with a Restricted TWT TID Bitmap Present subfield according to various embodiments of the present disclosure.
FIG. 31 illustrates an example of a Broadcast TWT Parameter Set field format with a Restricted TWT Traffic Info subfield according to various embodiments of the present disclosure.
FIG. 32 illustrates an example of a Restricted TWT Traffic Info field format with a Restricted TWT Peer-to-Peer TID Bitmap according to various embodiments of the present disclosure.

FIG. 30 illustrates an example of a Broadcast TWT Info subfield format in a Broadcast TWT Parameter Set field with a Restricted TWT TID Bitmap Present subfield according to various embodiments of the present disclosure. If the bit corresponding to the Restricted TWT TDLS TID Bitmap Present field is set to 1, it indicates that the Restricted TWT TDLS TID Bitmap subfield is present in the Broadcast TWT Parameter Set field. If the bit corresponding to the Restricted TWT TDLS TID Bitmap Present field is set to 0, it indicates that the Restricted TWT TDLS TID Bitmap subfield is not present in the Broadcast TWT Parameter Set field. Bit 1 (B1) in the Broadcast TWT Info subfield can also be used to make this indication, in which case the Peer-to-Peer Restricted TWT subfield would be represented by Bit 2 (B2) in the Broadcast TWT Info subfield.

According to some embodiments, a Restricted TWT Peer-to-Peer TID Bitmap subfield in a Restricted TWT Traffic Info field in a Broadcast TWT Parameter Set field corresponding to the restricted TWT schedule can indicate the TIDs for which TDLS peer STAs can use the corresponding restricted TWT schedule for communication over TDLS link.

FIG. 31 illustrates an example of a Broadcast TWT Parameter Set field format with a Restricted TWT Traffic Info subfield according to various embodiments of the present disclosure. FIG. 32 illustrates an example of a Restricted TWT Traffic Info field format with a Restricted TWT Peer-to-Peer TID Bitmap according to various embodiments of the present disclosure. If the $k^{th}$ bit in the Restricted TWT Peer-to-Peer TID Bitmap subfield is set to 1, it indicates that the corresponding TID is allowed for TDLS peer STAs to communicate over the TDLS link using the restricted TWT schedule. If the $k^{th}$ bit in the Restricted TWT Peer-to-Peer TID Bitmap subfield is set to 0, it indicates that the corresponding TID is not allowed for TDLS peer STAs to communicate over the TDLS link using the restricted TWT schedule.

FIGS. 33A-33E illustrate an example process for facilitating restricted TWT operation on P2P links according to various embodiments of the present disclosure. The process of FIGS. 33A-33E is discussed as being performed by a STA (e.g., STA1 that forms a P2P link with a peer STA), but it is understood that an AP such as AP 101 (e.g., AP1 of the BSS in which the STA is located) associated with the STA could perform a corresponding process. Additionally, for convenience, the process of FIGS. 33A-33E is discussed as being performed by a WI-FI STA such as STA 111, but it is understood that any suitable wireless communication device could perform the process.

Figure 33A:
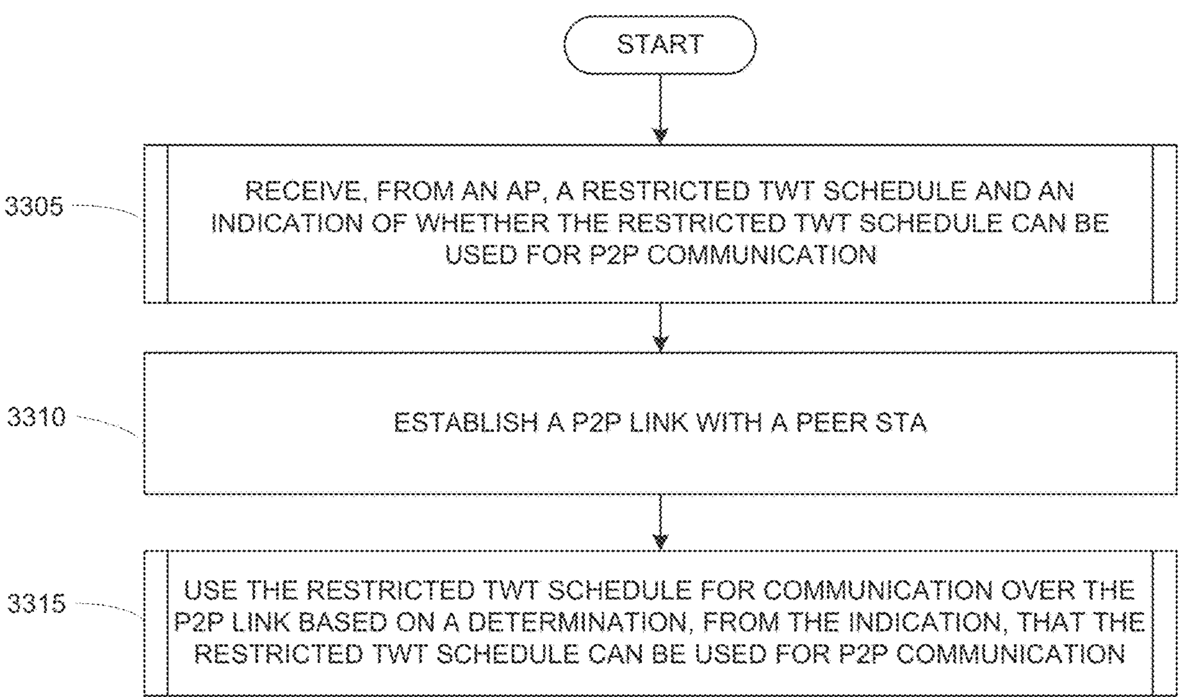
FIGS. 33A-33E illustrate an example process for facilitating restricted TWT operation on P2P links according to various embodiments of the present disclosure.

Referring now to FIG. 33A, beginning at step 3305 the STA receives, from the AP, a restricted TWT schedule and an indication of whether the restricted TWT schedule can be used for P2P communication. As illustrated further in FIG. 33E, step 3305 can also include the STA receiving, from the AP, an indication of a set of TIDs that can be transmitted on a P2P link using the restricted TWT schedule (step 3306). In this case, the STA may then determine that only traffic having a TID in the set of TIDs can be transmitted using the restricted TWT schedule for the P2P link (step 3307).

The indication of whether the restricted TWT schedule can be used for P2P communication can be a schedule type indication that indicates whether the restricted TWT schedule can be used only for P2P communication, both for P2P communication and for uplink/downlink communication, or only for uplink/downlink communication. The indication can be transmitted in various different frames or elements, as discussed herein above.

The STA next establishes the P2P link with a peer STA (step 3310). After this, the STA uses the restricted TWT schedule for communication over the P2P link based on a determination, from the indication, that the restricted TWT schedule can be used for P2P communication (step 3315). The STA may use the restricted TWT schedule to communicate over the P2P link in various ways, as discussed below.

Figure 33B:
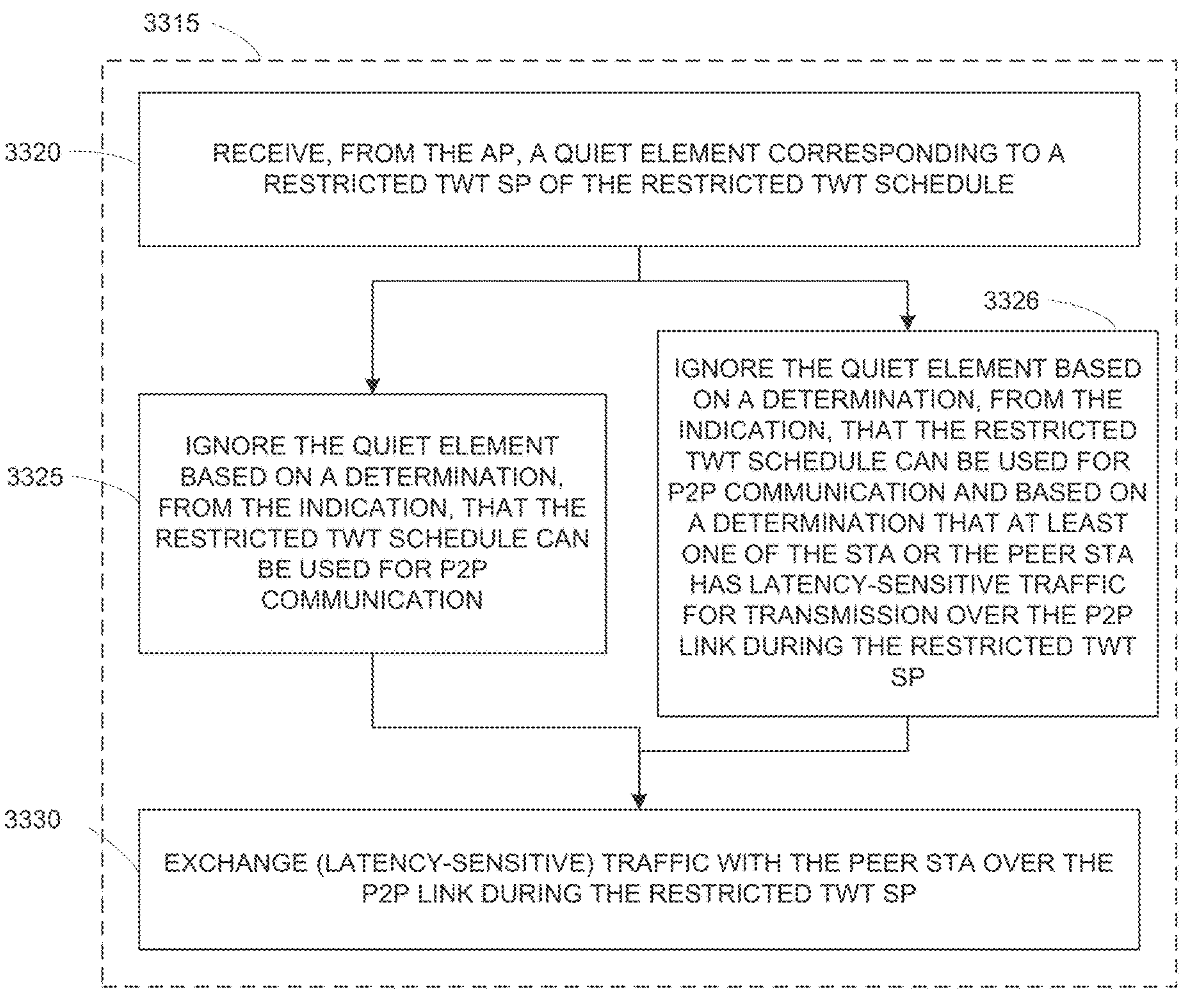

Referring now to FIG. 33B, in some embodiments of step 3315 the STA may receive, from the AP, a quiet element corresponding to a restricted TWT SP of the restricted TWT schedule (step 3320).

The STA ignores the quiet element based on a determination, from the indication received at step 3305, that the restricted TWT schedule can be used for P2P communication (step 3325). Alternatively, at step 3326 the STA may only ignore the quiet element based on the determination that the restricted TWT schedule can be used for P2P communication and based on a determination that at least one of the STA or the peer STA has latency-sensitive traffic for transmission over the P2P link during the restricted TWT SP.

The STA then exchanges traffic with the peer STA over the P2P link during the restricted TWT SP (step 3330). In the case in which step 3326 is performed instead of step 3325, the STA exchanges latency-sensitive traffic with the peer STA over the P2P link during the restricted TWT SP at step 3330.

Figure 33C:
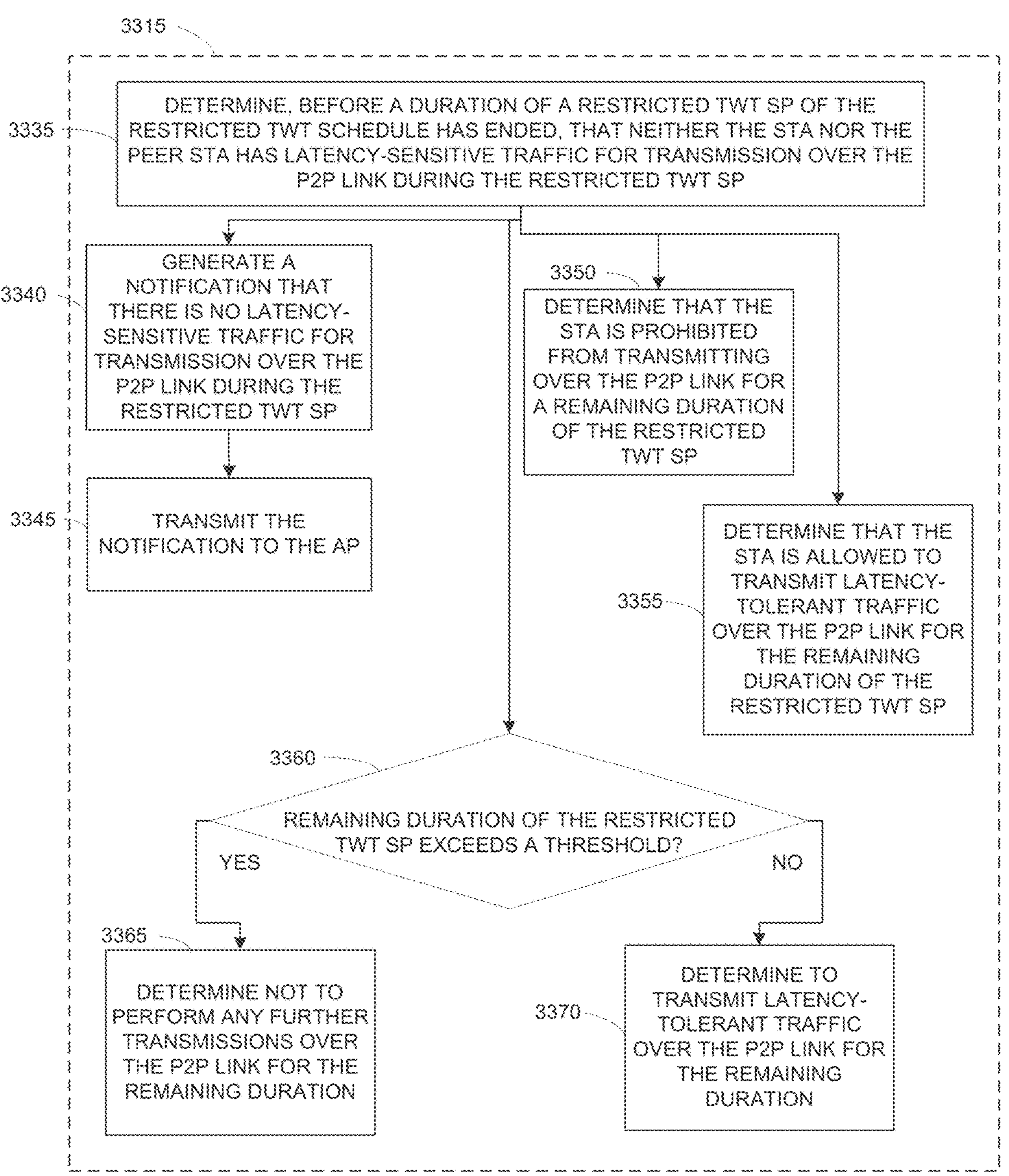
Figure 33D:
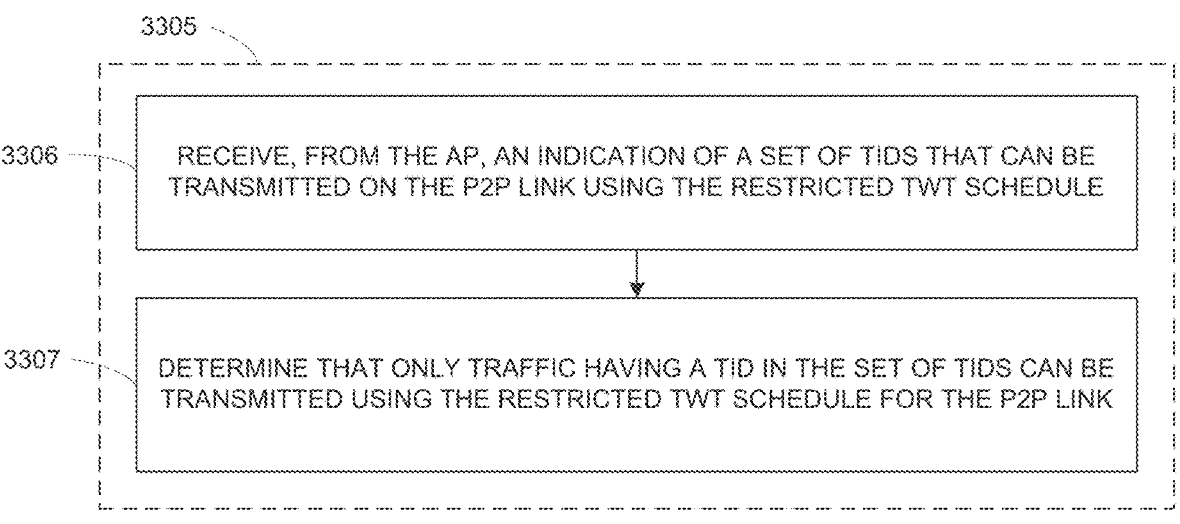

Referring now to FIG. 33C, in some embodiments of step 3315, based on a determination, from the indication, that the restricted TWT schedule can be used only for P2P communication, the STA determines, before a duration of a restricted TWT SP of the restricted TWT schedule has ended, that neither the STA nor the peer STA has latency-sensitive traffic for transmission over the P2P link during the restricted TWT SP (step 3335). The STA may take various different actions after this determination, as described below.

In some embodiments, after step 3335 the STA generates generate a notification that there is no latency-sensitive traffic for transmission over the P2P link during the restricted TWT SP (step 3340). The STA transmits this notification to the AP at step 3345.

In other embodiments, after step 3335 the STA determines that it is prohibited from transmitting over the P2P link for a remaining duration of the restricted TWT SP (step 3350).

In other embodiments, after step 3335 the STA determines that it is allowed to transmit latency-tolerant traffic over the P2P link for the remaining duration of the restricted TWT SP (step 3355).

In yet other embodiments, after step 3335 the STA determines whether the remaining duration of the restricted TWT SP exceeds a threshold (decision 3360). If the remaining duration does exceed the threshold, then the STA determines not to perform any further transmissions over the P2P link for the remaining duration of the restricted TWT SP (step 3365). Alternatively, if the remaining duration is less than the threshold, then the STA determines to transmit latency-tolerant traffic over the P2P link for the remaining duration of the restricted TWT SP (step 3370).

Figure 33E:
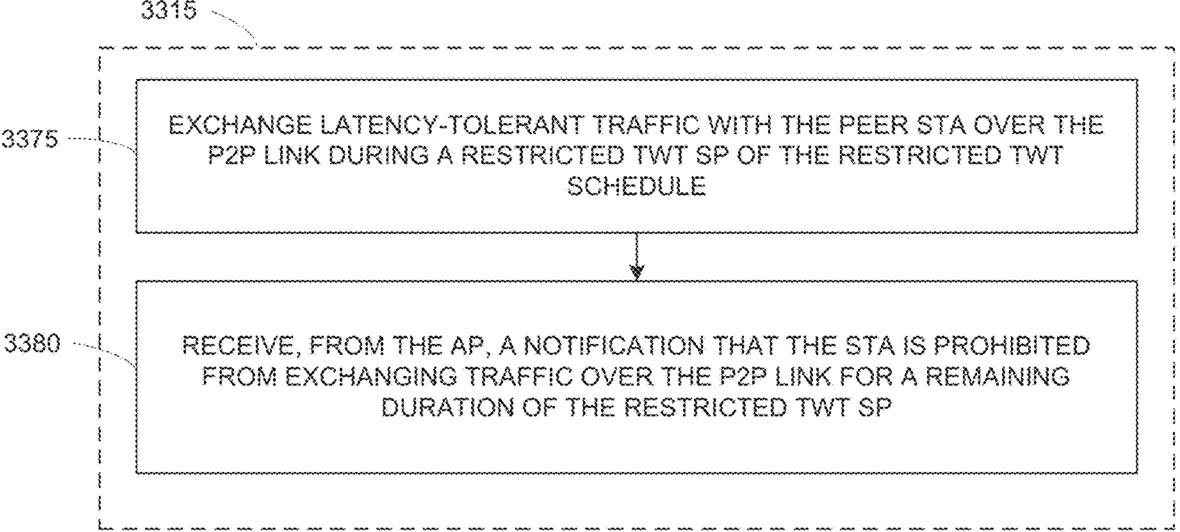

Referring now to FIG. 33E, in some embodiments of step 3315, the STA exchanges latency-tolerant traffic with the peer STA over the P2P link during a restricted TWT SP of the restricted TWT schedule (step 3375).

At step 3380, the STA receives, from the AP, a notification that the STA is prohibited from exchanging traffic over the P2P link for a remaining duration of the restricted TWT SP. For example, the AP may monitor the P2P link and, upon determining that the STAs are exchanging latency-tolerant traffic during the restricted TWT SP, send the notification to prohibit further transmissions.

The above flowcharts illustrate example methods that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A wireless station (STA) device comprising:

a transceiver configured to:

receive, from an access point (AP), a restricted target wake time (TWT) schedule and an indication of whether the restricted TWT schedule can be used for peer-to-peer (P2P) communication, and receive, from the AP, a quiet element corresponding to a restricted TWT service period (SP) of the restricted TWT schedule; and a processor operably coupled to the transceiver, the processor configured to:

establish a P2P link with a peer STA, determine to ignore the quiet element based on (i) a determination, from the indication, that the restricted TWT schedule can be used for P2P communication and (ii) a determination that the STA or the peer STA has latency-sensitive traffic to transmit over the P2P link during the restricted TWT SP, and use the restricted TWT schedule for communication over the P2P link based on a determination, from the indication, that the restricted TWT schedule can be used for P2P communication, wherein the transceiver is further configured to exchange the latency-sensitive traffic with the peer STA over the P2P link during the restricted TWT SP, and wherein the processor is further configured to:

determine not to ignore the quiet element for latency-tolerant traffic for transmission over the P2P link during the restricted TWT SP, and determine to not transmit the latency-tolerant traffic to the peer STA over the P2P link during the restricted TWT SP based on receipt of the quiet element.

2. The STA of claim 1, wherein the indication of whether the restricted TWT schedule can be used for P2P communication is a schedule type indication that indicates whether the restricted TWT schedule can be used only for P2P communication, both for P2P communication and for uplink/downlink communication, or only for uplink/downlink communication.

3. The STA of claim 1, wherein:

based on a determination, from the indication, that the restricted TWT schedule can be used only for P2P communication, the processor is further configured to:

during a duration of the restricted TWT SP of the restricted TWT schedule and before the duration has ended:

determine that the STA and the peer STA are finished transmitting latency-sensitive traffic over the P2P link during the restricted TWT SP; and generate a notification that there is no latency-sensitive traffic for transmission over the P2P link during the restricted TWT SP, and the transceiver is further configured to transmit the notification to the AP.

4. The STA of claim 1, wherein, based on a determination, during a duration of the restricted TWT SP of the restricted TWT schedule and before the duration has ended, that the STA and the peer STA are finished transmitting latency-sensitive traffic over the P2P link during the restricted TWT SP, the processor is further configured to:

determine that the STA is prohibited from transmitting over the P2P link for a remaining duration of the restricted TWT SP, determine that the STA is allowed to transmit latency-tolerant traffic over the P2P link for the remaining duration of the restricted TWT SP, or determine whether the remaining duration of the restricted TWT SP exceeds a threshold, and:

based on the remaining duration being less than the threshold, determine not to perform any further transmissions over the P2P link for the remaining duration; or based on the remaining duration exceeding the threshold, determine to transmit latency-tolerant traffic over the P2P link for the remaining duration.

5. The STA of claim 1, wherein:

the transceiver is further configured to receive, from the AP, an indication of a set of traffic identifiers (TIDs) that can be transmitted on the P2P link using the restricted TWT schedule, and the processor is further configured to determine that only traffic having a TID in the set of TIDs can be transmitted using the restricted TWT schedule for the P2P link.

6. The STA of claim 1, wherein the transceiver is further configured to:

exchange latency-tolerant traffic with the peer STA over the P2P link during the restricted TWT SP of the restricted TWT schedule, and receive, from the AP, a notification that the STA is prohibited from exchanging traffic over the P2P link for a remaining duration of the restricted TWT SP.

7. An access point (AP) device comprising:

a processor configured to generate an indication of whether a restricted target wake time (TWT) schedule can be used for peer-to-peer (P2P) communication by a station (STA) over a P2P link; and a transceiver operably coupled to the processor, the transceiver configured to:

broadcast the restricted TWT schedule and the indication, and broadcast a quiet element corresponding to a restricted TWT service period (SP) of the restricted TWT schedule wherein the quiet element is ignored based on (i) the indication indicating that the restricted TWT schedule can be used for P2P communication and (ii) that the STA has latency-sensitive traffic to transmit over the P2P link during the restricted TWT SP, and wherein the quiet element is not ignored based on the STA having latency-tolerant traffic for transmission over the P2P link during the restricted TWT SP.

8. The AP of claim 7, wherein the processor is further configured to generate the indication of whether the restricted TWT schedule can be used for P2P communication as a schedule type indication that indicates whether the restricted TWT schedule can be used only for P2P communication, both for P2P communication and for uplink/downlink communication, or only for uplink/downlink communication.

9. The AP of claim 7, wherein:

the transceiver is further configured to receive, from the STA, during a duration of the restricted TWT SP of the restricted TWT schedule and before the duration has ended, a notification that the STA and a peer STA are finished transmitting latency-sensitive traffic over the P2P link during the restricted TWT SP, and the processor is further configured to, based on the notification and based on a determination that the restricted TWT schedule is only for P2P communication, end the restricted TWT SP.

10. The AP of claim 7, wherein:

the processor is further configured to establish the restricted TWT schedule with a second STA on a second link between the AP and the second STA, and the transceiver is further configured to exchange, with the second STA over the second link, uplink/downlink traffic during the restricted TWT SP of the restricted TWT schedule, while the STA exchanges P2P traffic with a peer STA over the P2P link.

11. The AP of claim 7, wherein:

the processor is further configured to generate an indication of a set of traffic identifiers (TIDs) for which traffic having a TID in the set ofTIDs can be transmitted on the P2P link using the restricted TWT schedule, and the transceiver is further configured to transmit, to the STA, the indication.

12. The AP of claim 7, wherein:

the transceiver is further configured to monitor traffic exchanged between the STA and a peer STA over the P2P link during the restricted TWT SP of the restricted TWT schedule, the processor is further configured to generate, based on a determination that the traffic is latency-tolerant traffic, a notification that the STA and the peer STA are prohibited from exchanging traffic over the P2P link for a remaining duration of the restricted TWT SP, and the transceiver is further configured to transmit, to the STA and the peer STA, the notification.

13. A method for wireless communication performed by a wireless station (STA) device, the method comprising:

receiving, from an access point (AP), a restricted target wake time (TWT) schedule and an indication of whether the restricted TWT schedule can be used for peer-to-peer (P2P) communication;

receiving, from the AP, a quiet element corresponding to a restricted TWT service period (SP) of the restricted TWT schedule;

establishing a P2P link with a peer STA;

determining to ignore the quiet element based on (i) a determination, from the indication, that the restricted TWT schedule can be used for P2P communication and (ii) a determination that the STA or the peer STA has latency-sensitive traffic to transmit over the P2P link during the restricted TWT SP;

using the restricted TWT schedule for communication over the P2P link based on a determination, from the indication, that the restricted TWT schedule can be used for P2P communication;

exchanging the latency-sensitive traffic with the peer STA over the P2P link during the restricted TWT SP;

determining not to ignore the quiet element for latency-tolerant traffic for transmission over the P2P link during the restricted TWT SP; and determining to not transmit the latency-tolerant traffic to the peer STA over the P2P link during the restricted TWT SP based on receipt of the quiet element.

14. The method of claim 13, further comprising, based on a determination, from the indication, that the restricted TWT schedule can be used only for P2P communication:

during a duration of the restricted TWT SP of the restricted TWT schedule and before the duration has ended:

determining that the STA and the peer STA are finished transmitting latency-sensitive traffic over the P2P link during the restricted TWT SP;

generating a notification that there is no latency-sensitive traffic for transmission over the P2P link during the restricted TWT SP; and transmitting the notification to the AP.

15. The method of claim 13, further comprising:

receiving, from the AP, an indication of a set of traffic identifiers (TIDs) that can be transmitted on the P2P link using the restricted TWT schedule; and determining that only traffic having a TID in the set of TIDs can be transmitted using the restricted TWT schedule for the P2P link.

16. The method of claim 13, wherein the indication of whether the restricted TWT schedule can be used for P2P communication is a schedule type indication that indicates whether the restricted TWT schedule can be used only for P2P communication, both for P2P communication and for uplink/downlink communication, or only for uplink/downlink communication.

17. The method of claim 13, further comprising:

exchanging latency-tolerant traffic with the peer STA over the P2P link during the restricted TWT SP of the restricted TWT schedule, and receiving, from the AP, a notification that the STA is prohibited from exchanging traffic over the P2P link for a remaining duration of the restricted TWT SP.

* * * * *